(12) United States Patent
Wu et al.

(10) Patent No.: US 9,952,901 B2
(45) Date of Patent: Apr. 24, 2018

(54) POWER EFFICIENT HYBRID SCOREBOARD METHOD

(71) Applicant: Intel Corporation, Santa Clara, CA (US)

(72) Inventors: Haihua Wu, San Jose, CA (US); Julia A. Gould, San Jose, CA (US); Li-An Tang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 14/564,199

(22) Filed: Dec. 9, 2014

(65) Prior Publication Data
US 2016/0162340 A1 Jun. 9, 2016

(51) Int. Cl.
*G06F 9/46* (2006.01)
*G06F 9/48* (2006.01)

(52) U.S. Cl.
CPC .......... *G06F 9/4893* (2013.01); *Y02B 60/144* (2013.01)

(58) Field of Classification Search
CPC .... G06F 9/3838; G06F 9/3836; G06F 9/4893; Y02B 60/144
USPC ........................................ 718/102, 106, 104
See application file for complete search history.

(56) References Cited

U.S. PATENT DOCUMENTS

| | | | |
|---|---|---|---|
| 6,385,715 B1* | 5/2002 | Merchant | G06F 9/383 712/218 |
| 7,434,032 B1* | 10/2008 | Coon | G06F 9/3838 712/217 |
| 7,526,634 B1* | 4/2009 | Duluk, Jr. | G06F 9/52 712/216 |
| 8,306,752 B1* | 11/2012 | Gardner | G06F 19/24 435/6.1 |
| 8,933,953 B2* | 1/2015 | Jiang | G06F 9/3838 345/522 |
| 2002/0138714 A1* | 9/2002 | Leibholz | G06F 9/3836 712/217 |
| 2005/0147036 A1* | 7/2005 | Hammarlund | G06F 9/3836 370/230 |
| 2005/0149689 A1* | 7/2005 | Sodani | G06F 9/3836 712/1 |
| 2008/0198166 A1* | 8/2008 | Chung | G06T 15/005 345/501 |
| 2009/0002379 A1* | 1/2009 | Baeza | G06T 1/20 345/522 |
| 2010/0122044 A1* | 5/2010 | Ford | G06F 9/30036 711/154 |
| 2012/0308148 A1* | 12/2012 | Kim | H04N 19/00 382/233 |

(Continued)

OTHER PUBLICATIONS

Hong Jiang "The Intel Quick Suync Vide4o Technology in the 2nd-Generation Intel Core Processor Family", Intel Corporation presentation, Aug. 19, 2011, Slides 1-22.*

*Primary Examiner* — Meng An
*Assistant Examiner* — Willy W Huaracha
(74) *Attorney, Agent, or Firm* — Schiff Hardin LLP

(57) ABSTRACT

Described herein are technologies related to enforcing thread dependency using a hybrid scoreboard. An encoded video information that includes a plurality of threads is received, a first set and a second set of threads from the plurality of thread is determined, the first and second sets of threads are assigned to a hardware and a software, respectively, and dependency threads in the first and second sets of threads is enforced.

15 Claims, 16 Drawing Sheets

(56) References Cited

U.S. PATENT DOCUMENTS

2015/0220341 A1* 8/2015 Ohannessian, Jr. . G06F 9/30098
712/217

* cited by examiner

| 63 304 | 106 306 | 107 308 | 110 310 | 111 312 | 122 314 | 123 316 | 126 318 | 127 320 |
| --- | --- | --- | --- | --- | --- | --- | --- | --- |
| 213 322 | 256 302 | 257 350 | 260 366 | 261 382 | 272 398 | 273 414 | 276 430 | 277 446 |
| 215 324 | 258 337 | 259 352 | 262 368 | 263 384 | 274 400 | 275 416 | 278 432 | 279 448 |
| 221 326 | 264 338 | 265 354 | 268 370 | 269 386 | 280 402 | 281 418 | 284 434 | 285 450 |
| 223 328 | 266 340 | 267 356 | 270 372 | 271 388 | 282 404 | 283 420 | 286 436 | 287 452 |
| 245 330 | 288 342 | 289 358 | 292 374 | 293 390 | 304 406 | 305 422 | 308 438 | 309 454 |
| 247 332 | 290 344 | 291 360 | 294 376 | 295 392 | 306 408 | 307 424 | 310 440 | 311 456 |
| 253 334 | 296 346 | 297 362 | 300 378 | 301 394 | 312 410 | 313 426 | 316 442 | 317 458 |
| 255 336 | 298 348 | 299 364 | 302 380 | 303 396 | 314 412 | 315 428 | 318 444 | 319 460 |

300

POWER EFFICIENT HYBRID SCOREBOARD METHOD

BACKGROUND

Multi-thread decoding of encoded video information may be performed with different threads. For example, when the encoded video information has been encoded according to a particular video codec standard, the decoding tools that may be used to perform decoding tasks are designed to meet hardware constraints, usage constraints, or other criteria A decoding thread for a current macro block or coding unit may depend on one or more other decoding threads for the current macro block or coding unit and/or, one or more other macro block or coding unit. For example, preliminary analysis of thread dependencies is performed, and the dependencies are updated during process of decoding to allow accurate determination of which threads are currently executable or "runnable." A thread is considered to be runnable, for example, if its completion does not depend on any other uncompleted threads. In this example, the decoding threads may generally consume a lot of power especially in a software scoreboard-based approach where software polling is utilized to verify the completed/uncompleted tasks.

As such, there is a need to address various concerns about power reduction during the decoding process.

BRIEF DESCRIPTION OF THE DRAWINGS

FIG. 2 illustrates an example graphics processing unit (GPU) workload with a plurality of threads that include a dependent thread and associated threads as described in implementations herein.

FIGS. 3A and 3B illustrate an example dispatch order for an 8×8 block thread granularity High Efficiency Video Coding (HEVC) Intra-Prediction algorithm.

DETAILED DESCRIPTION

Described herein is a technology for enforcing thread dependency using a hybrid scoreboard-based approach. For example, the hybrid scoreboard-based approach utilizes a combination of a hardware scoreboard and a software scoreboard to enforce the thread dependency. A hardware scoreboard works faster with lower power consumption, but can only handle limited number of thread dependencies due to higher cost. A software scoreboard is flexible, can handle large number of thread dependencies without incurring extra cost. But it is slower and consumes more power In this example, the enforcement of the thread dependency is not limited by dependency entries and furthermore, efficient power usage is obtained in the process.

For example, a device antenna receives an encoded video information that includes a plurality of thread. The plurality of threads may include the dependency threads, which are one or more threads that may have to wait for another thread to finish its workload before the dependency thread starts its own execution.

In an implementation, a first set of threads (with long waiting time) and a second set of threads (with short waiting time) are derived from the plurality of threads based on a dispatch order, a spatial location, and the like, of each thread in the plurality of threads. For example, the first set of thread may include those threads that are dispatched later in time as compared to the threads from the second set of thread. In this example, the first set of threads may be assumed to have long waiting time and is assigned/processed through a hardware scoreboard; while the second set of threads, which is assumed to have short waiting time, is assigned and processed through a software scoreboard.

With the setup described above, the hardware scoreboard helps to enforce dependency by blocking a current thread until all of the first set of threads have been cleared (i.e., finished its workload) with very low power cost. Furthermore, there is a high probability that the second set of threads (i.e., short waiting time) may have finished their workloads at the time that the dependent thread polls the software scoreboard. As such, most software polling is avoided to save power.

Figure 1:
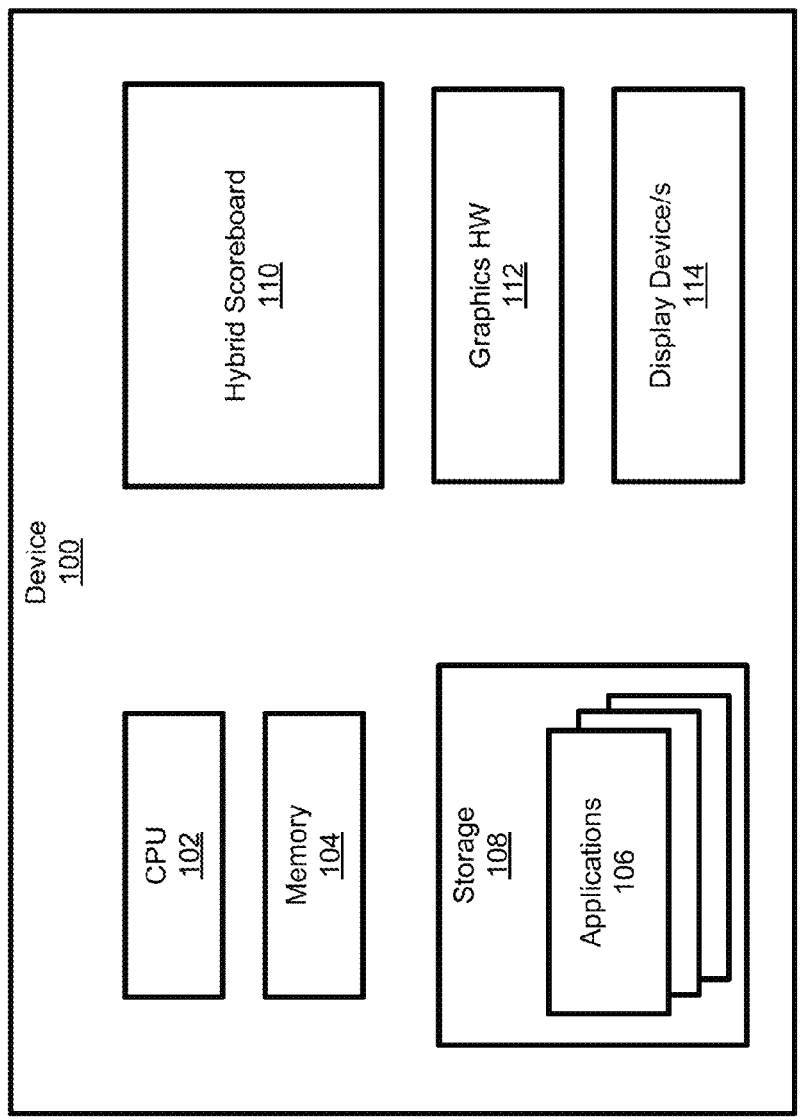
FIG. 1 illustrates an example block diagram of a computing device used in accordance with implementations described herein.

FIG. 1 is an example block diagram of a computing device 100 that may be used in accordance with implementations described herein. The computing device 100 may include a central processing unit (CPU) 102, a memory device 104, one or more applications 106 that may be stored in a storage 108, a hybrid scoreboard 110, a graphics hardware 112, and a display device 114.

Example computing device 100 may be a laptop computer, desktop computer, tablet computer, mobile device, or server, among others. In this example, the computing device 100 may include the CPU 102 configured to execute stored instructions, as well as the memory device 104 that stores instructions, which are executable by the CPU 102. The CPU 102 may control and coordinate the overall operations of the computing device 100. Furthermore, the CPU 102 may be a single core processor, a multi-core processor, a computing cluster, or any number of other configurations.

In an implementation, the memory device 104 may include a main memory of the computing device 100. In addition, the memory device 104 may include any form of random access memory (RAM), read-only memory (ROM), flash memory, or the like. For example, the memory device 104 may be one or more banks of memory chips or integrated circuits. In this example, the CPU 102 may have direct access to the memory device 104 through a bus connection (not shown).

The instructions that are executed by the CPU 102 may be used to execute any of a number of applications 106 residing within the storage device 108 of the computing device 100. The applications 106 may be any types of applications or programs having graphics, graphics objects, graphics images, graphics frames, video, or the like, to be displayed to a user (not shown) through the display device 114. The storage device 108 may include a hard drive, an optical drive, a thumb drive, an array of drives, or any combinations thereof.

In an implementation, the hybrid scoreboard 110 may include a processor, firmware, hardware scoreboard, software scoreboard or a combination thereof to enforce dependency threads, for example, from a received encoded video information. That is, the hybrid scoreboard 110 may reduce software polling in a pure software scoreboard-based approach. In this implementation, the hybrid scoreboard 110 utilizes the combination of the hardware and software scoreboard-based approach to overcome dependency limitation/entries of the hardware scoreboard-based approach. For example, a particular set of threads may be implemented using, for example, the hardware scoreboard while another set of threads may be implemented using the software scoreboard that uses software polling.

In an implementation, the hybrid scoreboard 110 may be configured to determine a first set of thread, which may include longer waiting times as compared to another set (e.g., second set) of threads from the plurality of thread. In this implementation, the first set of threads (i.e., later dispatched associated threads) may be assigned to the hardware scoreboard (not shown) while the second set of threads (i.e., earlier dispatched associated threads) may be assigned to the software scoreboard (not shown). The long and short waiting times for the first and second set of threads, respectively, may refer to the amount of time that a particular thread has to stall its execution until its associated threads (i.e., threads to which the current thread is dependent upon) have finished.

In an implementation, the hybrid scoreboard 110 inherits the full flexibility of the software-based score boarding including the unlimited number of dependencies to be enforced. At the same time, the hybrid scoreboard 110 may further facilitate reduction of the probability of software polling and saves power by using the hardware scoreboard.

With continuing reference to FIG. 1, the graphics hardware 112 may act as an interface to the display device 114, which may refer to any on-board or plug in devices such as a graphics processing unit (GPU), video cards/players/instructions, audio/music players, and the like. In this implementation, the graphics hardware 112 may facilitate, for example, relaying of completed thread dispatches from a buffer to the display device 114.

Figure 2:
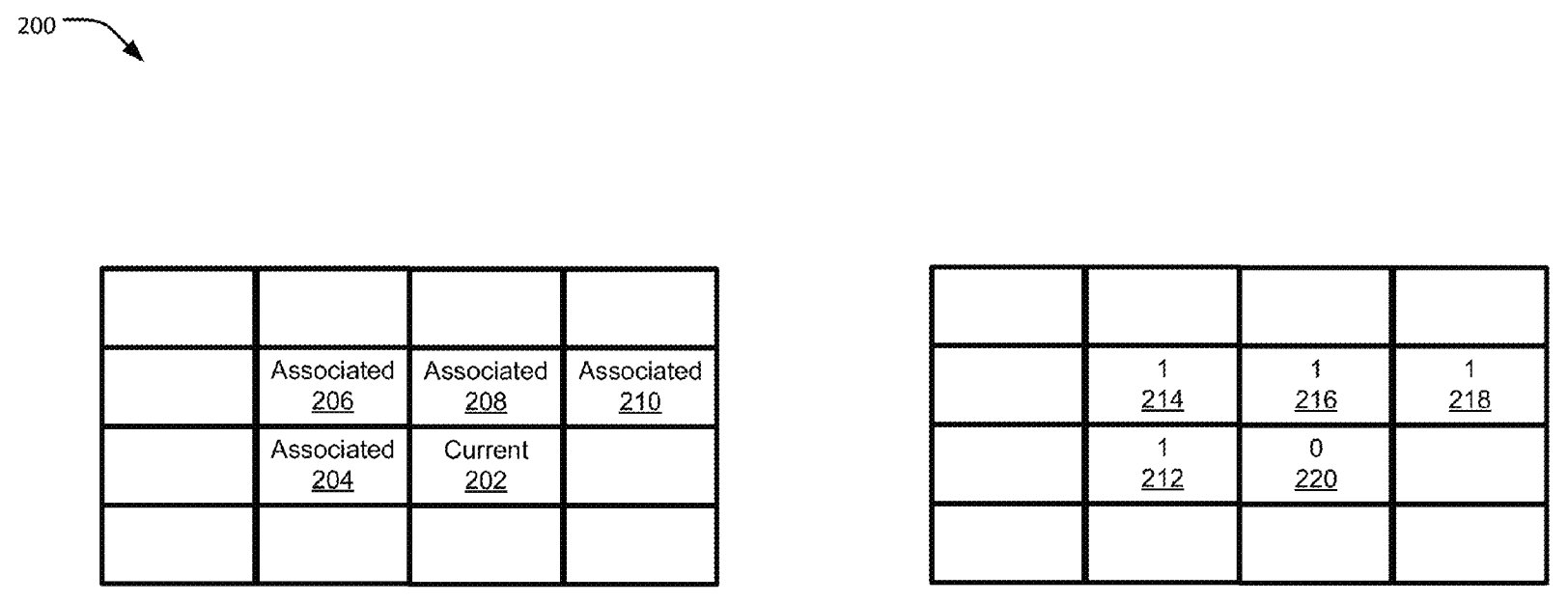

FIG. 2 illustrates an example graphics processing unit (GPU) workload 200 with a plurality of threads that include a dependent thread and associated threads as described in implementations herein.

In an implementation, the GPU workload 200 may include a neighbor thread dependency—where a current thread such as a current thread 202 may wait to consume its neighbor's (i.e., associated threads) produced result. In this implementation, the current thread 202 may be referred to as the dependent thread as it has to wait for the results of neighbor associated threads 204, 206, 208 and 210.

As shown, the left image of FIG. 2 depicts the neighbor thread dependency for the GPU workload 200 while the right image illustrates a software scoreboard, which reflects a status of the plurality of threads 202-210. For example, a status of each thread on a particular spatial location at the left image is shown at a corresponding spatial location in the software scoreboard. A status that includes "1" indicates that the particular thread is finished while a status "0" indicates that the thread has yet to finish its task/s.

To guarantee dependencies in software scoreboarding, a user may maintain a memory surface to hold the software scoreboard. When one dependent software thread is triggered (e.g., current thread 202), it polls the software scoreboard until all of its associated threads 204, 206, 208 and 210 have finished. At the end of each thread, the thread updates its entry in the software scoreboard to "1" as shown.

In a case of hardware scoreboard, the hardware scoreboard may guarantee the dependency with a specific hardware scoreboard mechanism. For example, although the hardware scoreboard may be present, there is no need to implement software polling. Additionally, the dependent thread such as the current thread 202 may not be invoked until all of its associated threads 204, 206, 208 and 210 have finished. In this example, the hardware scoreboard solution has a power and performance advantage; however, the hardware scoreboard may be limited by its maximum number of dependency entries such as when limited to eight entries.

In the present implementations described herein, the hybrid scoreboard 110 utilizes both the hardware scoreboard and software scoreboard to minimize the software polling probability to thereby considerably improve the power efficiency.

Figure 3A:

FIGS. 3A and 3B illustrate an example dispatch order 300 for an 8×8 block thread granularity High Efficiency Video Coding (HEVC) Intra-Prediction algorithm. The dependency threads in the dispatch order 300, for example, may be enforced using the hybrid scoreboarding as described in present implementations herein.

As shown in FIG. 3A, a block 302 is a dependent thread containing a dispatch order 256. The dispatch order may include the time instant when a particular thread was issued. As such, the waiting time may be based upon the amount of the current dispatch order for each block in the dispatch order 300. For example, associated threads (i.e., shaded blocks) as shown in blocks 304-320 may have dispatch orders 63, 106, 107, 110, 111, 122, 123, 126, and 127, respectively. Similarly, associated threads in blocks 322-336 may have dispatch orders 213, 215, 221, 223, 245, 247, 253 and 255, respectively. In these examples, the blocks 322-336 were issued later in time based from their higher dispatch order numbers as compared to the blocks 304-320. As such, assuming that all threads have similar workloads, the blocks 322-336 may finish later in time as compared to the blocks 304-320. As described herein, the blocks 322-336 may be referred to as belonging to a first set of threads while the blocks 304-320 may be referred to as a second set of thread.

In an implementation, the hybrid scoreboard 110 may be configured to process the first set of threads (i.e., blocks 322-336) through its hardware scoreboard while the second set of threads (i.e., blocks 304-320) is processed through the software scoreboard. Since the current dependent thread at block 302 does not continue to execute until all of the associated threads in blocks 304-336 are finished, the waiting time may depend upon the time when the last associated thread finishes (e.g., block 336 that includes dispatch order 255). In other words, the dependency penalty for the dependent block 302 is substantially impacted by the finish time of the last completed associated thread 255. In the implementation described above, the hardware scoreboard may help enforce the dependency by blocking the current thread 302 until all of the first set of threads have been cleared without power cost.

Although there is a need to perform software polling for the second set of threads that are processed by the software scoreboard, there is a high probability that the second set of threads may have finished their workloads at the time that the dependent thread 302 polls the software scoreboard as described in FIG. 2 above. As such, most software polling in the implementations described herein is avoided to save power.

FIG. 3B illustrates a real algorithm scenario where the dependency threads may be different based on spatial position. As described in FIG. 3A above, the total dependency count is 17 (i.e., shown in shaded gray), and the relative spatial positions from the current thread are (−1, −1), (−1, 0), (−1, 1), (−1, 2), (−1, 3), (−1, 4), (−1, 5), (−1, 6), (−1, 7), (0, −1), (1, −1), (2, −1), (3, −1), (4, −1), (5, −1), (6, −1), and (7, −1), respectively. In FIG. 3B, an individual thread may depend alone on a subset of these 17 dependencies.

For example, the dependency thread at block 342 with a dispatch order 288 has a different dependency pattern based on its current spatial location. As shown, the dependency thread or block 342 includes 13 dependency locations. That is, blocks 328-336 are associated threads that include dispatch orders 223, 245, 247, 253, and 255, respectively, and blocks 340, 356, 372, 388, 404, 420, 436, and 452 are associated threads that include dispatch orders 266, 267, 270, 271, 282, 283, 286, and 287, respectively.

In another example, a dependency block 406 with dispatch order 304 may include a different dependency pattern based on its current spatial location. For example, the dependency block 406 includes 9 dependency locations. That is, blocks 388-396, 404, 420, 436, and 452 are associated that include dispatch orders 271, 293, 295, 301, 303, 282, 283, 286, and 287, respectively.

In the above examples, assuming that the hardware scoreboard of the hybrid scoreboard 110 has 8 dependency entries limit and that the dependency entries are fixed on the kernel level, a similar selection is made (i.e., 8 dependencies) for all the software threads in the same kernel.

In an implementation, a statistical algorithm or method is utilized to determine the best 8 dependencies. An example statistical algorithm using a histogram is further discussed in details below.

Figure 4:
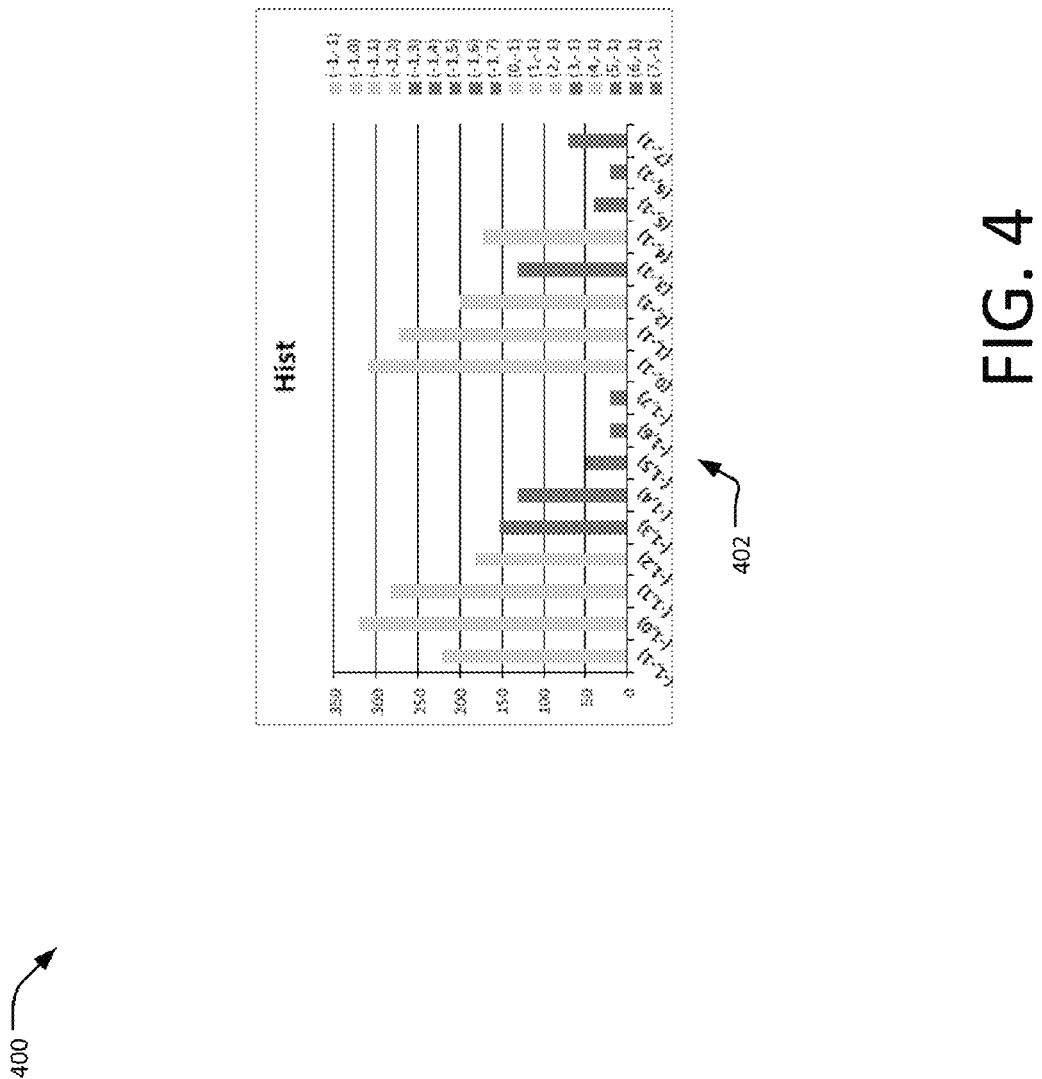
FIG. 4 illustrates histogram that may be utilized by a statistical algorithm to determine best dependencies in a given plurality of thread.

FIG. 4 is an example histogram 400 that may be utilized by the statistical algorithm to determine the best dependencies in a given plurality of thread. For example, the hybrid scoreboard 110 may utilize the histogram 400 to determine the 8 dependencies for the software scoreboard.

As shown, each dependency location may occupy a cell 402 in the histogram 400. For example, each associated threads 304-334 in FIG. 3A occupies a corresponding cell 402. By getting the dispatch order information and knowing the dependency for each thread, an "M" number, for example, is chosen/picked for the first set of threads and the histogram cell 402 is updated based on relative spatial position of each thread in the first set of threads. In this example, the "M" number may be any positive integer value from 1 to the hardware dependency amount limit.

When the "M" number is set to equal the hardware dependency amount limit of 8, the 8 first set of threads for the dependency thread block 302 may include 213/215/221/223/245/247/253/255, and corresponding histogram cells 402 are cell (−1, 0), cell (−1, 1), cell (−1, 2), cell (−1, 3), cell (−1, 4), cell (−1, 5), cell (−1, 6), and cell (−1, 7), respectively. For each histogram cell value one is added.

Figure 8:
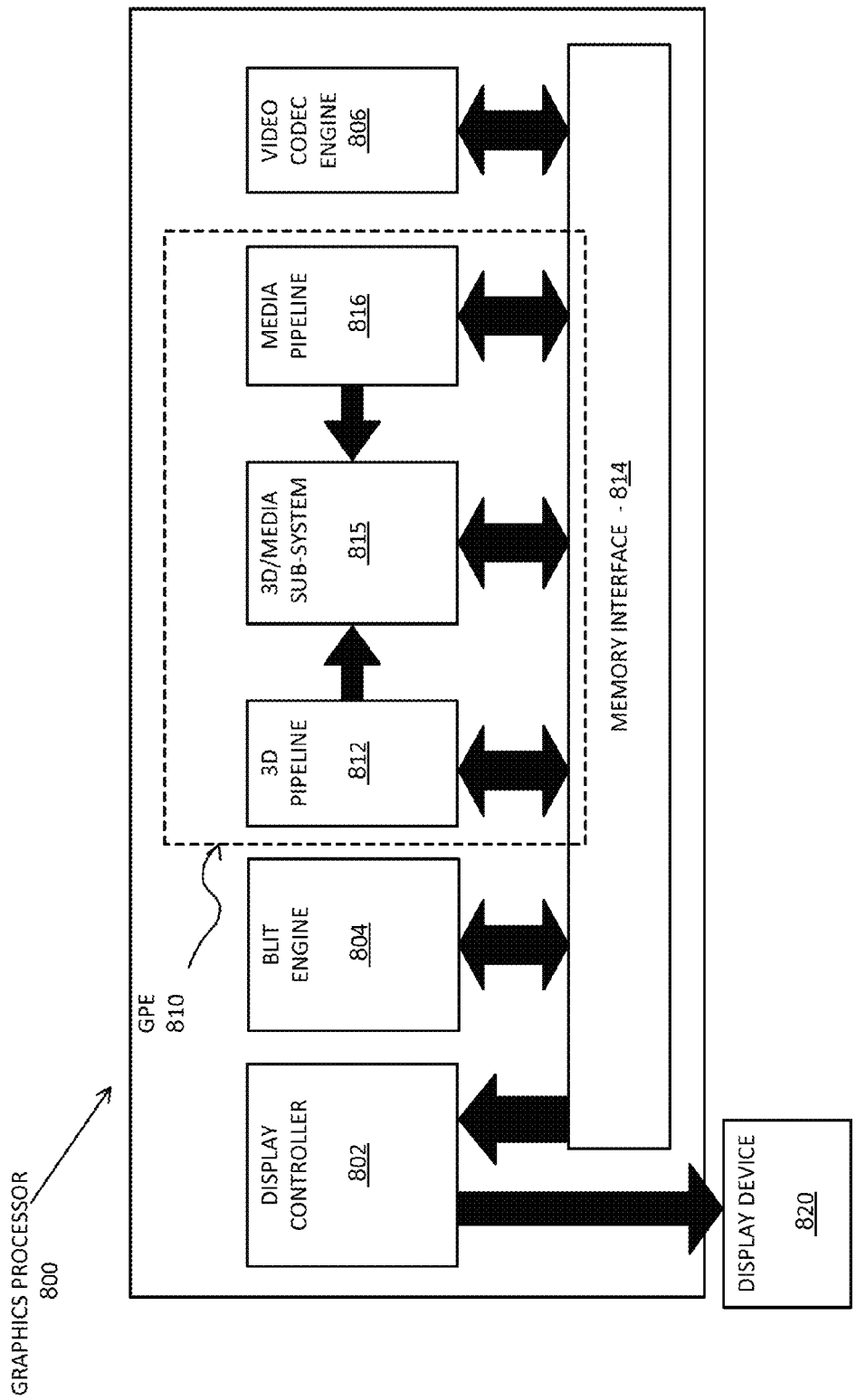
FIG. 8 is a block diagram of one embodiment of a graphics processor which may be a discrete graphics processing unit, or may be graphics processor integrated with a plurality of processing cores.

For the dependent thread 288 in FIG. 3B, 8 first set of threads are occupied by threads 266/267/270/271/282/283/286/287, and their related histogram cells are cell (0, −1), cell (1, −1), cell (2, −1), cell (3, −1), cell (4, −1), cell (5, −1), cell (6, −1), and cell (7, −1), respectively. For each histogram cell one is added.

For another dependent thread 304, 8 first set of threads (i.e., later locations) are occupied by threads 282/283/286/287/293/295/301/303, and their related histogram cells are cell (0, −1), cell (1, −1), cell (2, −1), cell (3, −1), cell (−1, 0), cell (−1, 1), cell (−1, 2), and cell (−1, 3), respectively. For each histogram cell value one is added and if the current thread's N dependency locations is less than M, the N cells are updated accordingly.

With continuing reference to FIG. 4, a selection of higher "M" histogram value cells is made and the corresponding spatial locations for the selected "M" histogram value cells are assigned to the hardware scoreboard dependency. In other words, the remaining dependency locations are handled by the software scoreboard.

With more thread workload information, the hardware dependency location assignment may be improved by adding a weight for each thread's contribution. For example, if a pre-knowledge that thread 255 at block 336 has an above average workload in terms of execution time, then a higher weight may be added to its contribution. In another example, if the information for the associated thread 213 at block 322 has a longer than average workload as compared to the thread 255 at block 336, then an increase in weight may be added to raise the contribution of the thread 213 at block 322.

Based from the histogram 400 and the resulting weights for the corresponding cells 402, the 8 dependencies for the software scoreboard may be chosen by the hybrid scoreboard 110.

Figure 5:
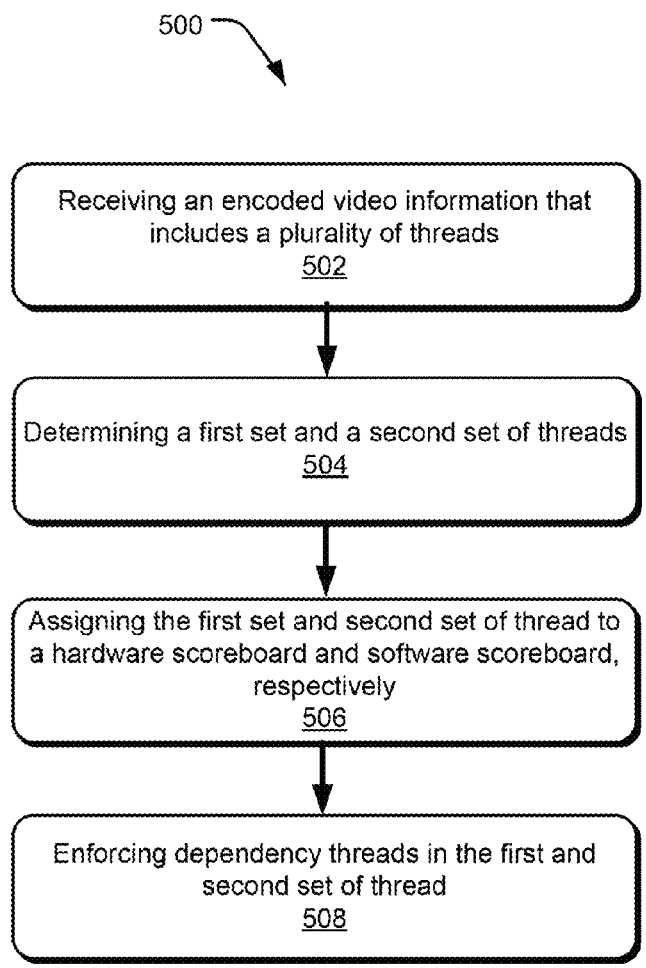
FIG. 5 illustrates an example flowchart illustrating an example method for implementing a hybrid scoreboard to enforce dependency thread as described herein.

FIG. 5 shows an example process flowchart 500 illustrating an example method for implementing a hybrid scoreboard to enforce dependency thread as described herein. The hybrid scoreboard, for example, utilizes the combination of HW and/or SW threads. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 502, receiving an encoded video information that includes a plurality of threads is performed. For example, the plurality of threads may include dependent thread block 302 that includes the dispatch order 256 and other associated threads. In this example, the threads may include a set of operations i.e., workloads that is executed for decoding of the encoded video information.

At block 504, determining a first set and a second set of threads from the plurality of thread is performed. For example, the first set of thread may include those threads that were dispatched later in time as compared to the second set of thread. In other words, the first set of thread has higher number of dispatch orders as compared to the dispatch orders contained in the second set of threads.

At block 506, assigning the first and second set of thread to a HW and SW, respectively, is performed. For example, the first set of threads is assigned to the HW section while the second set of threads is assigned to the SW section of the computing device. In this example, a statistical algorithm may be implemented to determine the best dependencies for both hardware and software scoreboards.

At block 508, enforcing dependency threads in the first and second set of thread is performed.

Overview—FIGS. 6-9

Figure 6:
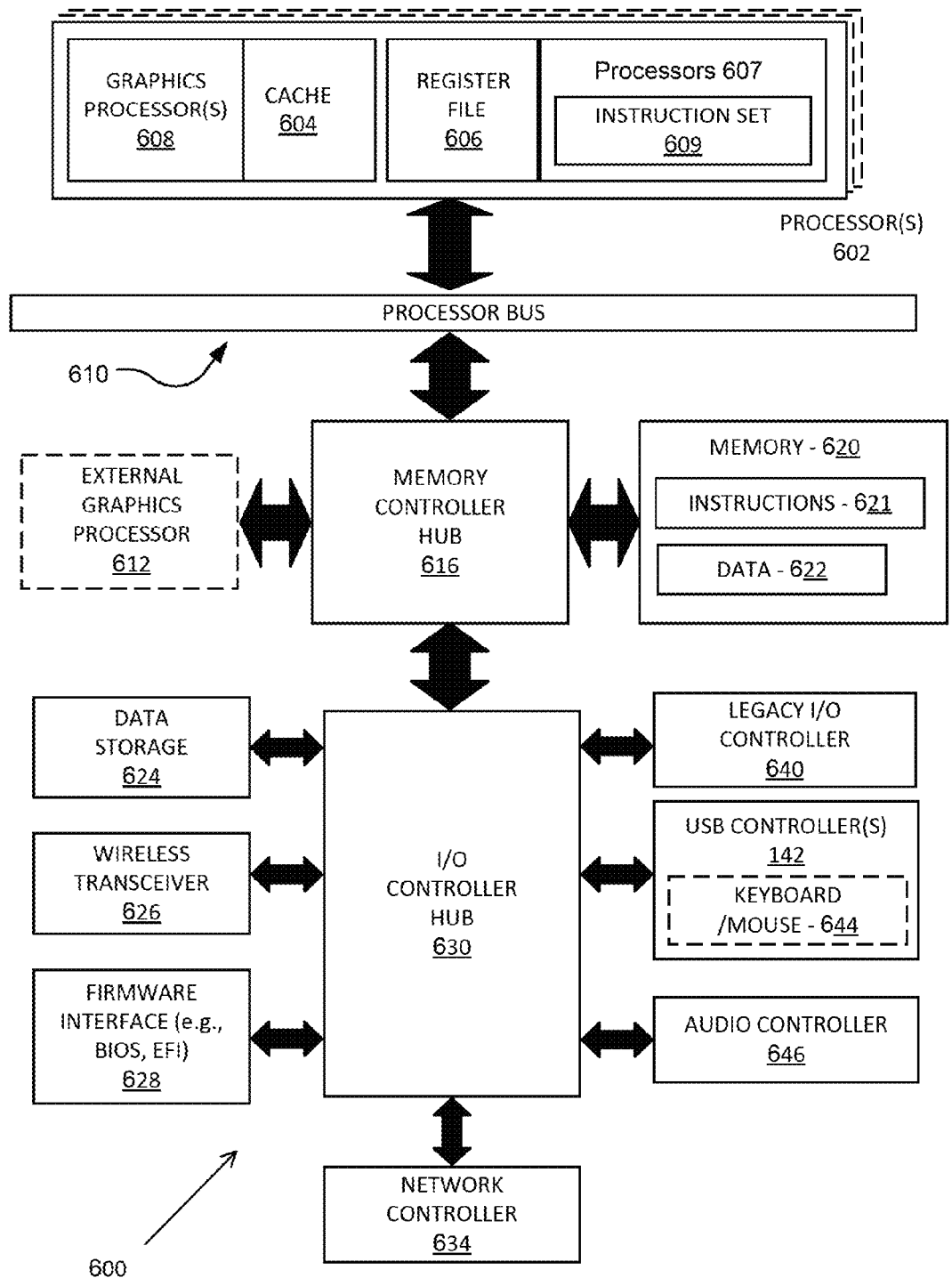
FIG. 6 is a block diagram of a data processing system according to an embodiment.

FIG. 6 is a block diagram of a data processing system 600, according to an embodiment. The data processing system 600 includes one or more processors 602 and one or more graphics processors 608, and may be a single processor desktop system, a multiprocessor workstation system, or a server system having a large number of processors 602 or processor cores 607. In on embodiment, the data processing system 600 is a system on a chip integrated circuit (SOC) for use in mobile, handheld, or embedded devices.

An embodiment of the data processing system 600 can include, or be incorporated within a server-based gaming platform, a game console, including a game and media console, a mobile gaming console, a handheld game console, or an online game console. In one embodiment, the data processing system 600 is a mobile phone, smart phone, tablet computing device or mobile Internet device. The data processing system 600 can also include, couple with, or be integrated within a wearable device, such as a smart watch wearable device, smart eyewear device, augmented reality device, or virtual reality device. In one embodiment, the data processing system 600 is a television or set top box device having one or more processors 602 and a graphical interface generated by one or more graphics processors 608.

The one or more processors 602 each include one or more processor cores 607 to process instructions which, when executed, perform operations for system and user software. In one embodiment, each of the one or more processor cores 607 is configured to process a specific instruction set 609. The instruction set 609 may facilitate complex instruction set computing (CISC), reduced instruction set computing (RISC), or computing via a very long instruction word (VLIW). Multiple processor cores 607 may each process a different instruction set 609 which may include instructions to facilitate the emulation of other instruction sets. A processor core 607 may also include other processing devices, such a digital signal processor (DSP).

In one embodiment, the processor 602 includes cache memory 604. Depending on the architecture, the processor 602 can have a single internal cache or multiple levels of internal cache. In one embodiment, the cache memory is shared among various components of the processor 602. In one embodiment, the processor 602 also uses an external cache (e.g., a Level 3 (L3) cache or last level cache (LLC)) (not shown) which may be shared among the processor cores 607 using known cache coherency techniques. A register file 606 is additionally included in the processor 602 which may include different types of registers for storing different types of data (e.g., integer registers, floating point registers, status registers, and an instruction pointer register). Some registers may be general-purpose registers, while other registers may be specific to the design of the processor 602.

The processor 602 is coupled to a processor bus 610 to transmit data signals between the processor 602 and other components in the system 600. The system 600 uses an exemplary 'hub' system architecture, including a memory controller hub 616 and an input output (I/O) controller hub 630. The memory controller hub 616 facilitates communication between a memory device and other components of the system 600, while the I/O controller hub (ICH) 630 provides connections to I/O devices via a local I/O bus.

The memory device 620, can be a dynamic random access memory (DRAM) device, a static random access memory (SRAM) device, flash memory device, or some other memory device having suitable performance to serve as process memory. The memory 620 can store data 622 and instructions 621 for use when the processor 602 executes a process. The memory controller hub 616 also couples with an optional external graphics processor 612, which may communicate with the one or more graphics processors 608 in the processors 602 to perform graphics and media operations.

The ICH 630 enables peripherals to connect to the memory 620 and processor 602 via a high-speed I/O bus. The I/O peripherals include an audio controller 646, a firmware interface 628, a wireless transceiver 626 (e.g., Wi-Fi, Bluetooth), a data storage device 624 (e.g., hard disk drive, flash memory, etc.), and a legacy I/O controller for coupling legacy (e.g., Personal System 2 (PS/2)) devices to the system. One or more Universal Serial Bus (USB) controllers 642 connect input devices, such as keyboard and mouse 644 combinations. A network controller 634 may also couple to the ICH 630. In one embodiment, a high-performance network controller (not shown) couples to the processor bus 610.

Figure 7:
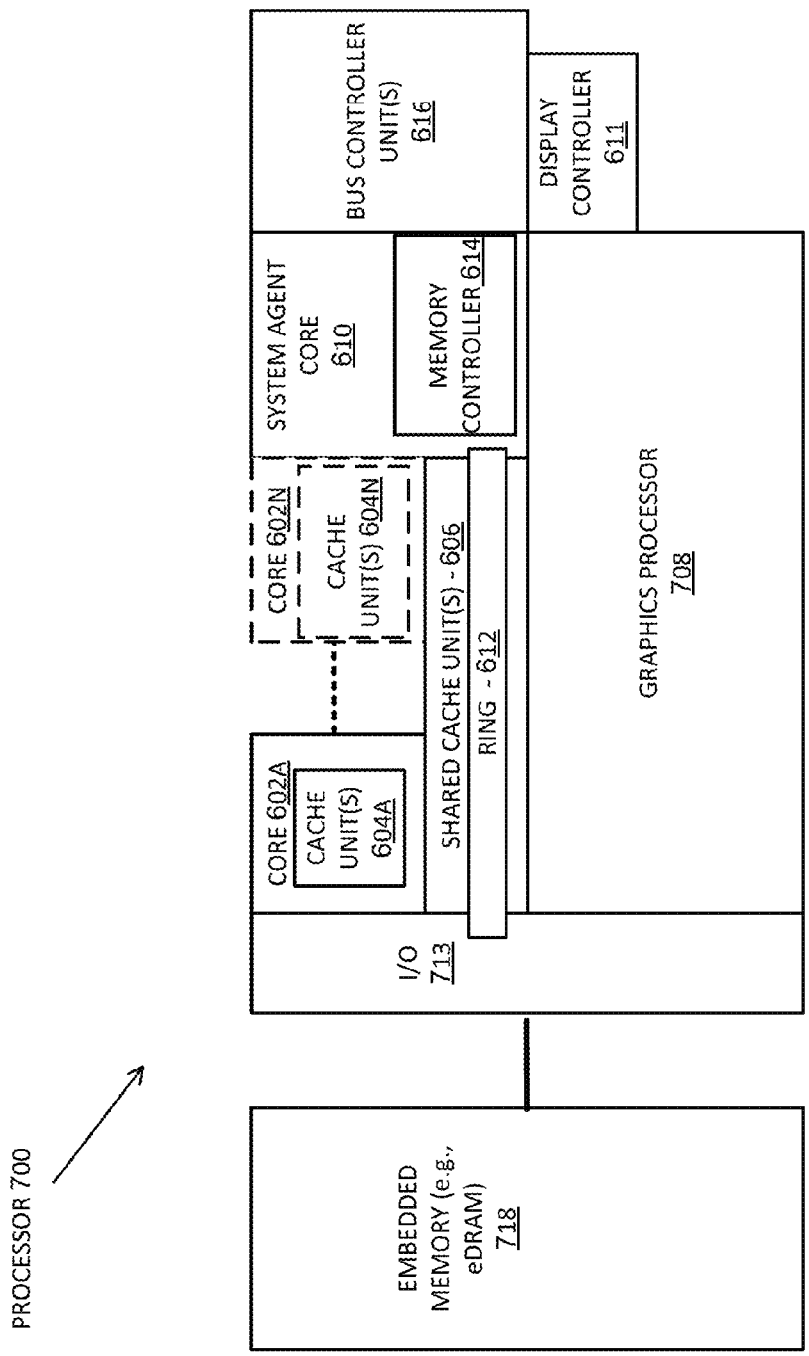
FIG. 7 is a block diagram of an embodiment of a processor having one or more processor cores, an integrated memory controller, and an integrated graphics processor.

FIG. 7 is a block diagram of an embodiment of a processor 700 having one or more processor cores 702A-N, an integrated memory controller 714, and an integrated graphics processor 708. The processor 700 can include additional cores up to and including additional core 702N represented by the dashed lined boxes. Each of the cores 702A-N includes one or more internal cache units 704A-N. In one embodiment each core also has access to one or more shared cached units 706.

The internal cache units 704A-N and shared cache units 706 represent a cache memory hierarchy within the processor 700. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 706 and 704A-N.

The processor 700 may also include a set of one or more bus controller units 716 and a system agent 710. The one or more bus controller units manage a set of peripheral buses, such as one or more Peripheral Component Interconnect buses (e.g., PCI, PCI Express). The system agent 710 provides management functionality for the various processor components. In one embodiment, the system agent 710 includes one or more integrated memory controllers 714 to manage access to various external memory devices (not shown).

In one embodiment, one or more of the cores 702A-N include support for simultaneous multi-threading. In such embodiment, the system agent 710 includes components for coordinating and operating cores 702A-N during multi-threaded processing. The system agent 710 may additionally include a power control unit (PCU), which includes logic and components to regulate the power state of the cores 702A-N and the graphics processor 708.

The processor 700 additionally includes a graphics processor 708 to execute graphics processing operations. In one embodiment, the graphics processor 708 couples with the set of shared cache units 706, and the system agent unit 710, including the one or more integrated memory controllers 714. In one embodiment, a display controller 711 is coupled with the graphics processor 708 to drive graphics processor output to one or more coupled displays. The display controller 711 may be separate module coupled with the graphics processor via at least one interconnect, or may be integrated within the graphics processor 708 or system agent 710.

In one embodiment a ring based interconnect unit 712 is used to couple the internal components of the processor 700, however an alternative interconnect unit may be used, such as a point to point interconnect, a switched interconnect, or other techniques, including techniques well known in the art. In one embodiment, the graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM module. In one embodiment each of the cores 702-N and the graphics processor 708 use the embedded memory modules 718 as shared last level cache.

In one embodiment cores 702A-N are homogenous cores executing the same instruction set architecture. In another embodiment, the cores 702A-N are heterogeneous in terms of instruction set architecture (ISA), where one or more of the cores 702A-N execute a first instruction set, while at least one of the other cores executes a subset of the first instruction set or a different instruction set.

The processor 700 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 700 can be implemented on one or more chips or as a system on a chip (SOC) integrated circuit having the illustrated components, in addition to other components.

FIG. 8 is a block diagram of one embodiment of a graphics processor 800 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 800 includes a memory interface 814 to access memory. The memory interface 814 can be an interface to local memory, one or more internal caches, one or more shared external caches, and/or to system memory.

The graphics processor 800 also includes a display controller 802 to drive display output data to a display device 820. The display controller 802 includes hardware for one or more overlay planes for the display and composition of multiple layers of video or user interface elements. In one embodiment the graphics processor 800 includes a video codec engine 806 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In one embodiment, the graphics processor 800 includes a block image transfer (BLIT) engine 804 to perform two-dimensional (2D) rasterizer operations including, for example, bit-boundary block transfers. However, in one embodiment, 2D graphics operations are performed using one or more components of the graphics-processing engine (GPE) 810. The graphics-processing engine 810 is a compute engine for performing graphics operations, including three-dimensional (8D) graphics operations and media operations.

The GPE 810 includes a 8D pipeline 812 for performing 8D operations, such as rendering three-dimensional images and scenes using processing functions that act upon 3D primitive shapes (e.g., rectangle, triangle, etc.). The 3D pipeline 812 includes programmable and fixed function elements that perform various tasks within the element and/or spawn execution threads to a 3D/Media sub-system 815. While the 3D pipeline 812 can be used to perform media operations, an embodiment of the GPE 810 also includes a media pipeline 816 that is specifically used to perform media operations, such as video post processing and image enhancement.

In one embodiment, the media pipeline 816 includes fixed function or programmable logic units to perform one or more specialized media operations, such as video decode acceleration, video de-interlacing, and video encode acceleration in place of, or on behalf of the video codec engine 806. In on embodiment, the media pipeline 816 additionally includes a thread spawning unit to spawn threads for execution on the 3D/Media sub-system 815. The spawned threads perform computations for the media operations on one or more graphics execution units included in the 3D/Media sub-system.

The 3D/Media subsystem 815 includes logic for executing threads spawned by the 3D pipeline 812 and media pipeline 816. In one embodiment, the pipelines send thread execution requests to the 3D/Media subsystem 815, which includes thread dispatch logic for arbitrating and dispatching the various requests to available thread execution resources. The execution resources include an array of graphics execution units to process the 3D and media threads. In one embodiment, the 3D/Media subsystem 815 includes one or more internal caches for thread instructions and data. In one embodiment, the subsystem also includes shared memory, including registers and addressable memory, to share data between threads and to store output data.

Figure 9:
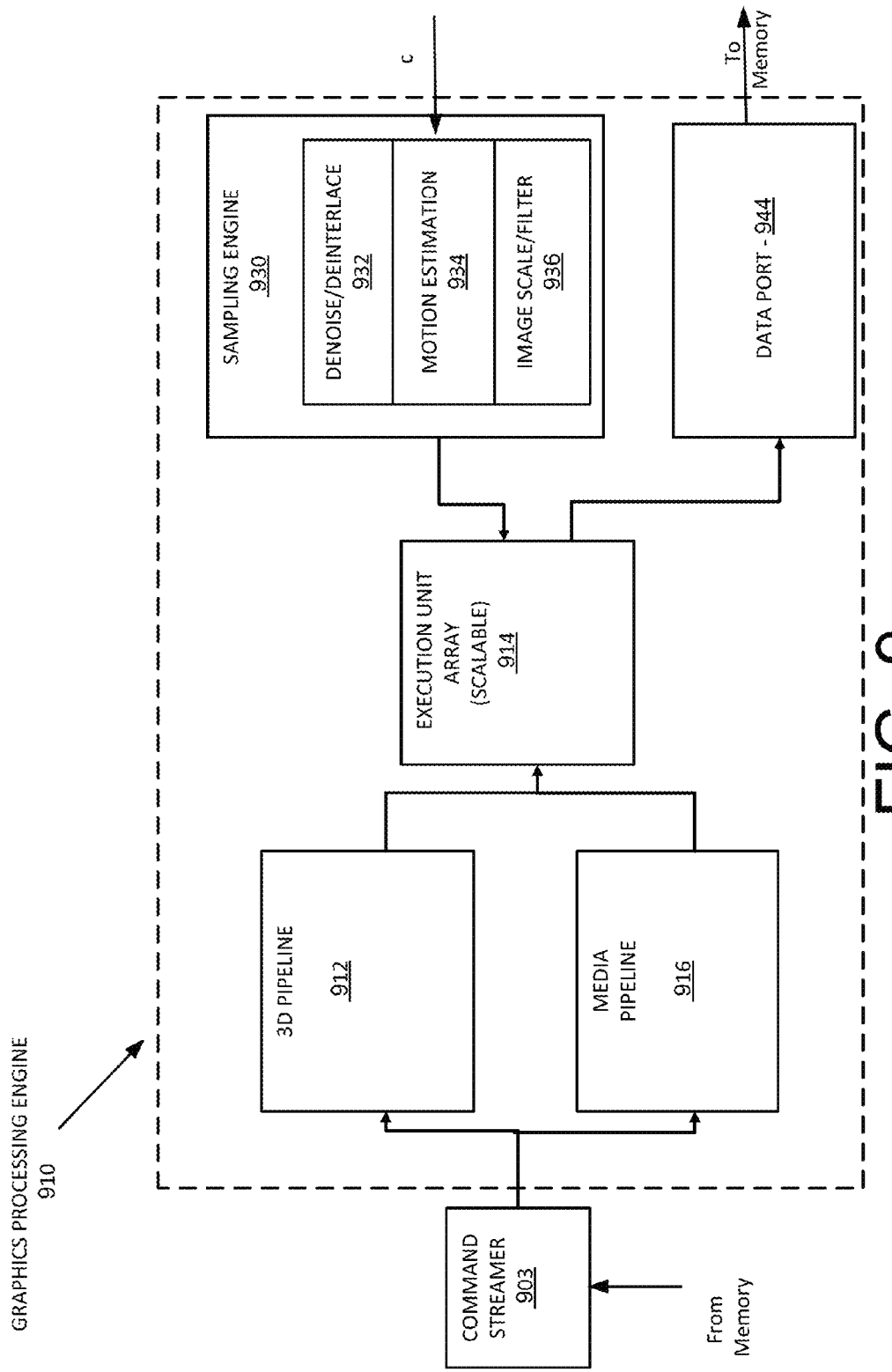
FIG. 9 is a block diagram of an embodiment of a graphics processing engine for a graphics processor.

3D/Media Processing—FIG. 9

FIG. 9 is a block diagram of an embodiment of a graphics processing engine 910 for a graphics processor. In one embodiment, the graphics processing engine (GPE) 910 is a version of the GPE 310 shown in FIG. 3. The GPE 910 includes a 3D pipeline 912 and a media pipeline 916, each of which can be either different from or similar to the implementations of the 3D pipeline 312 and the media pipeline 316 of FIG. 3.

In one embodiment, the GPE 910 couples with a command streamer 903, which provides a command stream to the GPE 3D and media pipelines 912, 916. The command streamer 903 is coupled to memory, which can be system memory, or one or more of internal cache memory and shared cache memory. The command streamer 903 receives commands from the memory and sends the commands to the 3D pipeline 912 and/or media pipeline 916. The 3D and media pipelines process the commands by performing operations via logic within the respective pipelines or by dispatching one or more execution threads to the execution unit array 914. In one embodiment, the execution unit array 914 is scalable, such that the array includes a variable number of execution units based on the target power and performance level of the GPE 910.

A sampling engine 930 couples with memory (e.g., cache memory or system memory) and the execution unit array 914. In one embodiment, the sampling engine 930 provides a memory access mechanism for the scalable execution unit array 914 that allows the execution array 914 to read graphics and media data from memory. In one embodiment, the sampling engine 930 includes logic to perform specialized image sampling operations for media.

The specialized media sampling logic in the sampling engine 930 includes a de-noise/de-interlace module 932, a motion estimation module 934, and an image scaling and filtering module 936. The de-noise/de-interlace module 932 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 932 includes dedicated motion detection logic (e.g., within the motion estimation engine 934).

The motion estimation engine 934 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 934 to perform operations on video at the macro-block level that may otherwise be computationally intensive to perform using a general-purpose processor. In one embodiment, the motion estimation engine 934 is generally available to graphics processor components to assist with video decode and processing functions that are sensitive or adaptive to the direction or magnitude of the motion within video data.

The image scaling and filtering module 936 performs image-processing operations to enhance the visual quality of generated images and video. In one embodiment, the scaling and filtering module 936 processes image and video data during the sampling operation before providing the data to the execution unit array 914.

In one embodiment, the graphics processing engine 910 includes a data port 944, which provides an additional mechanism for graphics subsystems to access memory. The data port 944 facilitates memory access for operations including render target writes, constant buffer reads, scratch memory space reads/writes, and media surface accesses. In one embodiment, the data port 944 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 914 communicate with the data port by exchanging messages via a data distribution interconnect that couples each of the sub-systems of the graphics processing engine 910.

Figure 10:
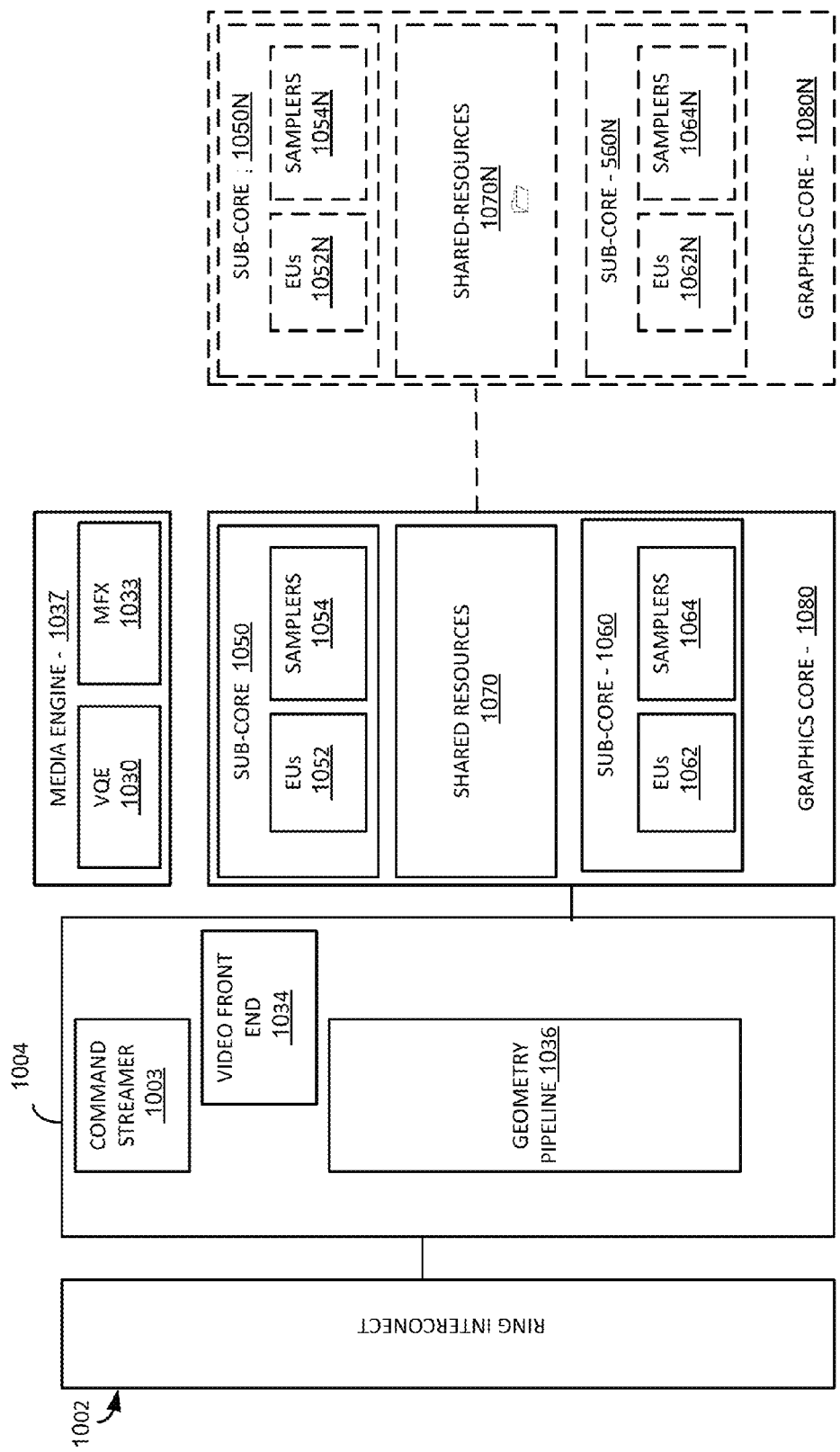
FIG. 10 is a block diagram of another embodiment of a graphics processor.
Figure 11:
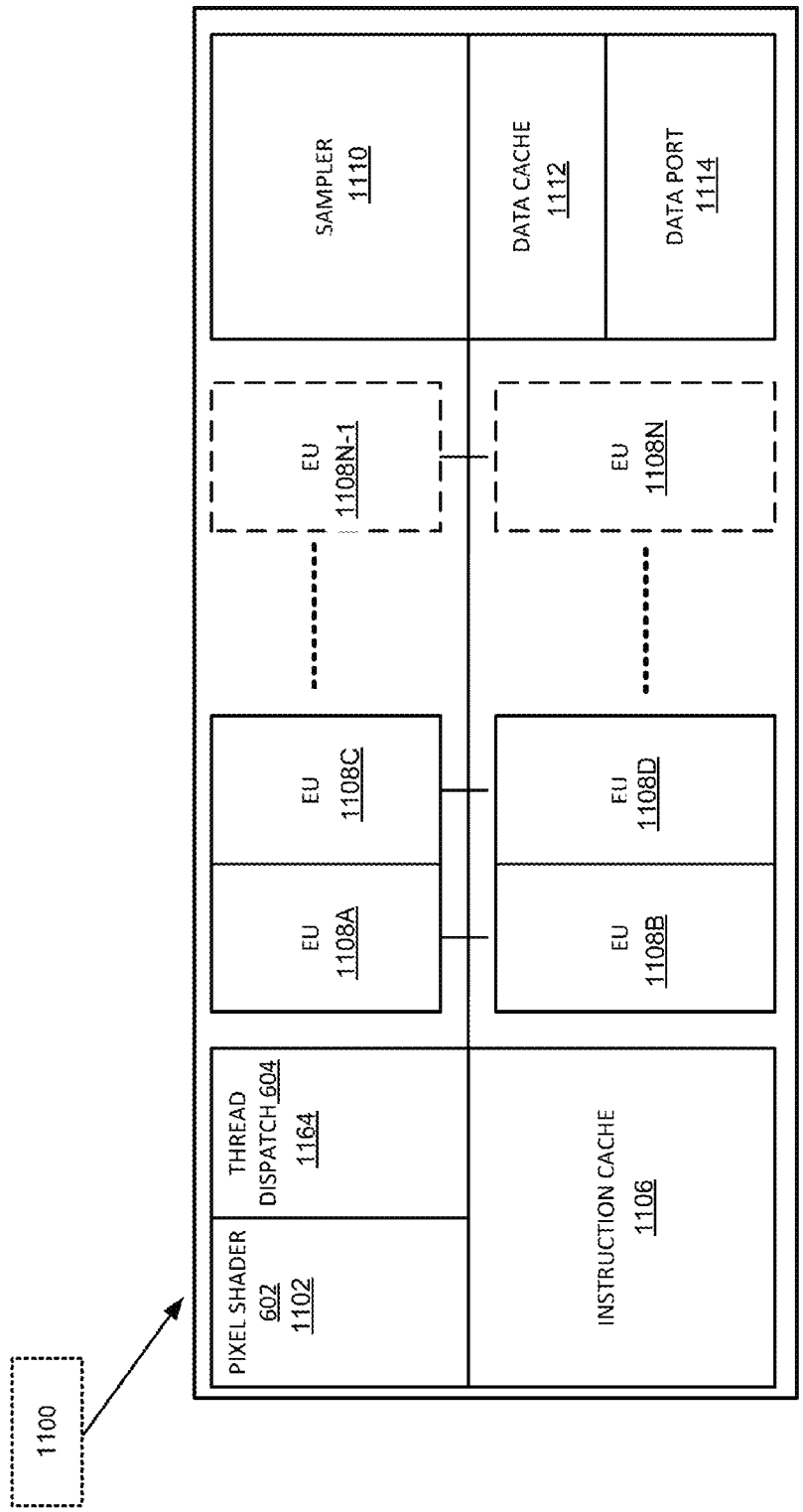
FIG. 11 illustrates thread execution logic including an array of processing elements employed in one embodiment of a graphics processing engine.
Figure 12:
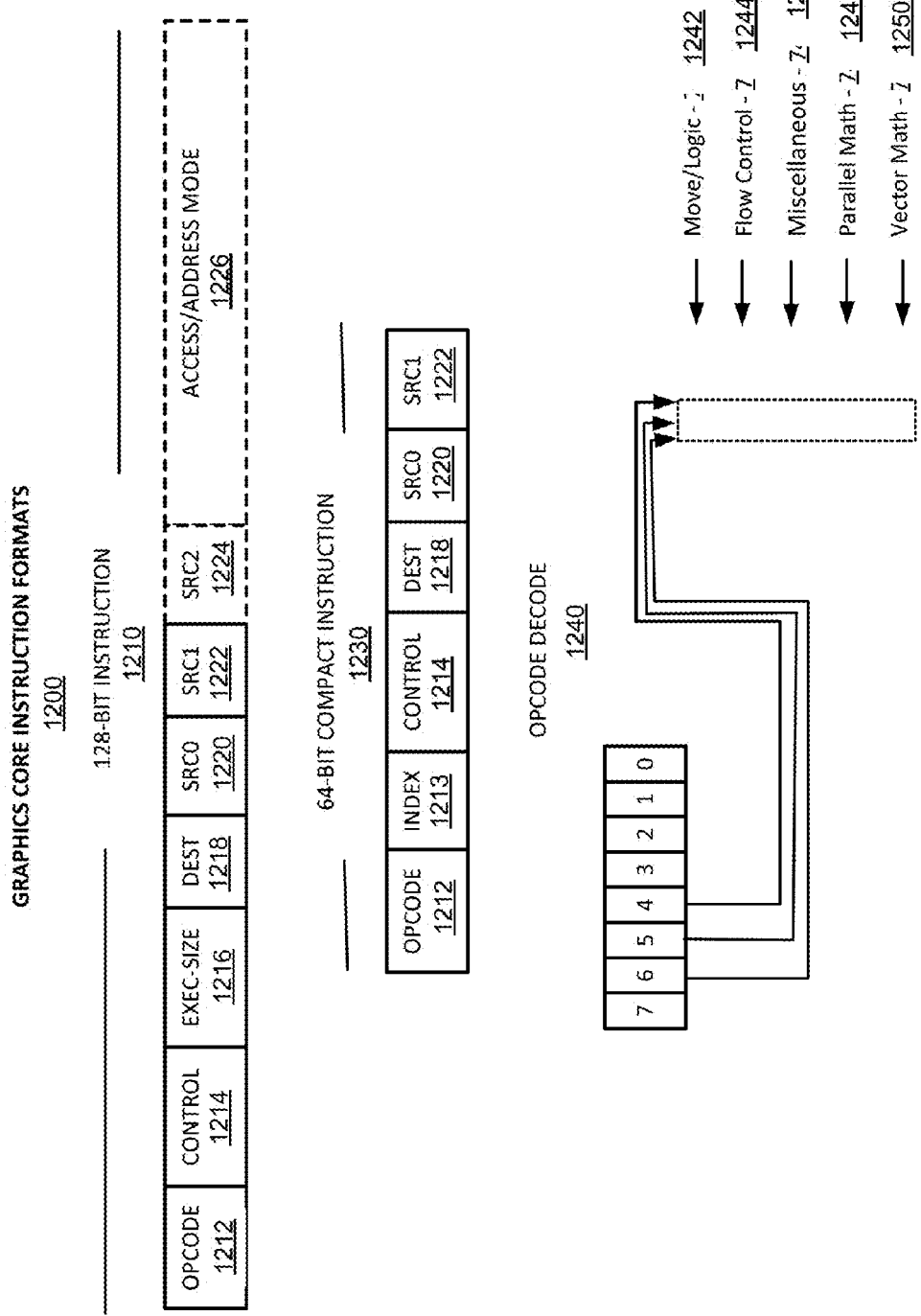
FIG. 12 is a block diagram illustrating a graphics processor execution unit instruction format according to an embodiment.

Execution Units—FIGS. 10-12

FIG. 10 is a block diagram of another embodiment of a graphics processor. In one embodiment, the graphics processor includes a ring interconnect 1002, a pipeline front-end 1004, a media engine 1037, and graphics cores 1080A-N. The ring interconnect 1002 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 1002. The incoming commands are interpreted by a command streamer 1003 in the pipeline front-end 1004. The graphics processor includes scalable execution logic to perform 3D geometry processing and media processing via the graphics core(s) 1080A-N. For 3D geometry processing commands, the command streamer 1003 supplies the commands to the geometry pipeline 1036. For at least some media processing commands, the command streamer 1003 supplies the commands to a video front end 1034, which couples with a media engine 1037. The media engine 1037 includes a video quality engine (VQE) 1030 for video and image post processing and a multi-format encode/decode (MFX) 1033 engine to provide hardware-accelerated media data encode and decode. The geometry pipeline 1036 and media engine 1037 each generate execution threads for the thread execution resources provided by at least one graphics core 1080A.

The graphics processor includes scalable thread execution resources featuring modular cores 1080A-N (sometime referred to as core slices), each having multiple sub-cores 1050A-N, 1060A-N (sometimes referred to as core sub-slices). The graphics processor can have any number of graphics cores 1080A through 1080N. In one embodiment, the graphics processor includes a graphics core 1080A having at least a first sub-core 1050A and a second core sub-core 1060A. In another embodiment, the graphics processor is a low power processor with a single sub-core (e.g., 1050A). In one embodiment, the graphics processor includes multiple graphics cores 1080A-N, each including a set of first sub-cores 1050A-N and a set of second sub-cores 1060A-N. Each sub-core in the set of first sub-cores 1050A-N includes at least a first set of execution units 1052A-N and media/texture samplers 1054A-N. Each sub-core in the set of second sub-cores 1060A-N includes at least a second set of execution units 1062A-N and samplers 1064A-N. In one embodiment, each sub-core 1050A-N, 1060A-N shares a set of shared resources 1070A-N. In one embodiment, the shared resources include shared cache memory and pixel operation logic. Other shared resources may also be included in the various embodiments of the graphics processor.

FIG. 11 illustrates thread execution logic 1100 including an array of processing elements employed in one embodiment of a graphics processing engine. In one embodiment, the thread execution logic 1100 includes a pixel shader 1102, a thread dispatcher 1104, instruction cache 1106, a scalable execution unit array including a plurality of execution units 1108A-N, a sampler 1110, a data cache 1112, and a data port 1114. In one embodiment the included components are interconnected via an interconnect fabric that links to each of the components. The thread execution logic 1100 includes one or more connections to memory, such as system memory or cache memory, through one or more of the instruction cache 1106, the data port 1114, the sampler 1110, and the execution unit array 1108A-N. In one embodiment, each execution unit (e.g. 1108A) is an individual vector processor capable of executing multiple simultaneous threads and processing multiple data elements in parallel for each thread. The execution unit array 1108A-N includes any number individual execution units.

In one embodiment, the execution unit array 1108A-N is primarily used to execute "shader" programs. In one embodiment, the execution units in the array 1108A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 1108A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 1108A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quadword (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 1106) are included in the thread execution logic 1100 to cache thread instructions for the execution units. In one embodiment, one or more data caches (e.g., 1112) are included to cache thread data during thread execution. A sampler 1110 is included to provide texture sampling for 3D operations and media sampling for media operations. In one embodiment, the sampler 1110 includes specialized texture or media sampling functionality to process texture or media data during the sampling process before providing the sampled data to an execution unit.

During execution, the graphics and media pipelines send thread initiation requests to the thread execution logic 1100 via thread spawning and dispatch logic. The thread execution logic 1100 includes a local thread dispatcher 1104 that arbitrates thread initiation requests from the graphics and media pipelines and instantiates the requested threads on one or more execution units 1108A-N. For example, the geometry pipeline dispatches vertex processing, tessellation, or geometry processing threads to the thread execution logic 1100. The thread dispatcher 1104 can also process runtime thread spawning requests from the executing shader programs.

Once a group of geometric objects have been processed and rasterized into pixel data, the pixel shader 1102 is invoked to further compute output information and cause results to be written to output surfaces (e.g., color buffers, depth buffers, stencil buffers, etc.). In one embodiment, the pixel shader 1102 calculates the values of the various vertex attributes that are to be interpolated across the rasterized object. The pixel shader 1102 then executes an API-supplied pixel shader program. To execute the pixel shader program, the pixel shader 1102 dispatches threads to an execution unit (e.g., 1108A) via the thread dispatcher 1104. The pixel shader 1102 uses texture sampling logic in the sampler 1110 to access texture data in texture maps stored in memory. Arithmetic operations on the texture data and the input geometry data compute pixel color data for each geometric fragment, or discards one or more pixels from further processing.

In one embodiment, the data port 1114 provides a memory access mechanism for the thread execution logic 1100 output processed data to memory for processing on a graphics processor output pipeline. In one embodiment, the data port 1114 includes or couples to one or more cache memories (e.g., data cache 1112) to cache data for memory access via the data port.

FIG. 12 is a block diagram illustrating a graphics processor execution unit instruction format according to an embodiment. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 1210. A 64-bit compacted instruction format 1230 is available for some instructions based on the selected instruction, instruction options, and number of operands. The native 128-bit format 1210 provides access to all instruction options, while some options and operations are restricted in the 64-bit format 1230. The native instructions available in the 64-bit format 1230 varies by embodiment. In one embodiment, the instruction is compacted in part using a set of index values in an index field 1213. The execution unit hardware references a set of compaction tables based on the index values and uses the compaction table outputs to reconstruct a native instruction in the 128-bit format 1210.

For each format, an instruction opcode 1212 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 1212 enables control over certain execution options, such as channels selection (e.g., predication) and data channel order (e.g., swizzle). For 128-bit instructions 1210 an exec-size field 1216 limits the number of data channels that will be executed in parallel. The exec-size field 1216 is not available for use in the 64-bit compact instruction format 1230.

Some execution unit instructions have up to three operands including two source operands, src0 1222, src1 1222, and one destination 1218. In one embodiment, the execution units support dual destination instructions, where one of the destinations is implied. Data manipulation instructions can have a third source operand (e.g., SRC2 1224), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 1240. For an 8-bit opcode, bits 4, 5, and 6 allow the execution unit to determine the type of opcode. The precise opcode grouping shown is exemplary. In one embodiment, a move and logic opcode group 1242 includes data movement and logic instructions (e.g., mov, cmp). The move and logic group 1242 shares the five most significant bits (MSB), where move instructions are in the form of 0000xxxxb (e.g., 0x0x) and logic instructions are in the form of 0001xxxxb (e.g., 0x01). A flow control instruction group 1244 (e.g., call, jmp) includes instructions in the form of 0010xxxxb (e.g., 0x20). A miscellaneous instruction group 1246 includes a mix of instructions, including synchronization instructions (e.g., wait, send) in the form of 0011xxxxb (e.g., 0x30). A parallel math instruction group 1248 includes component-wise arithmetic instructions (e.g., add, mul) in the form of 0100xxxxb (e.g., 0x40). The parallel math group 1248 performs the arithmetic operations in parallel across data channels. The vector math group 1250 includes arithmetic instructions (e.g., dp4) in the form of 0101xxxxb (e.g., 0x50). The vector math group performs arithmetic such as dot product calculations on vector operands.

Graphics Pipeline—FIG. 8

Figure 13:
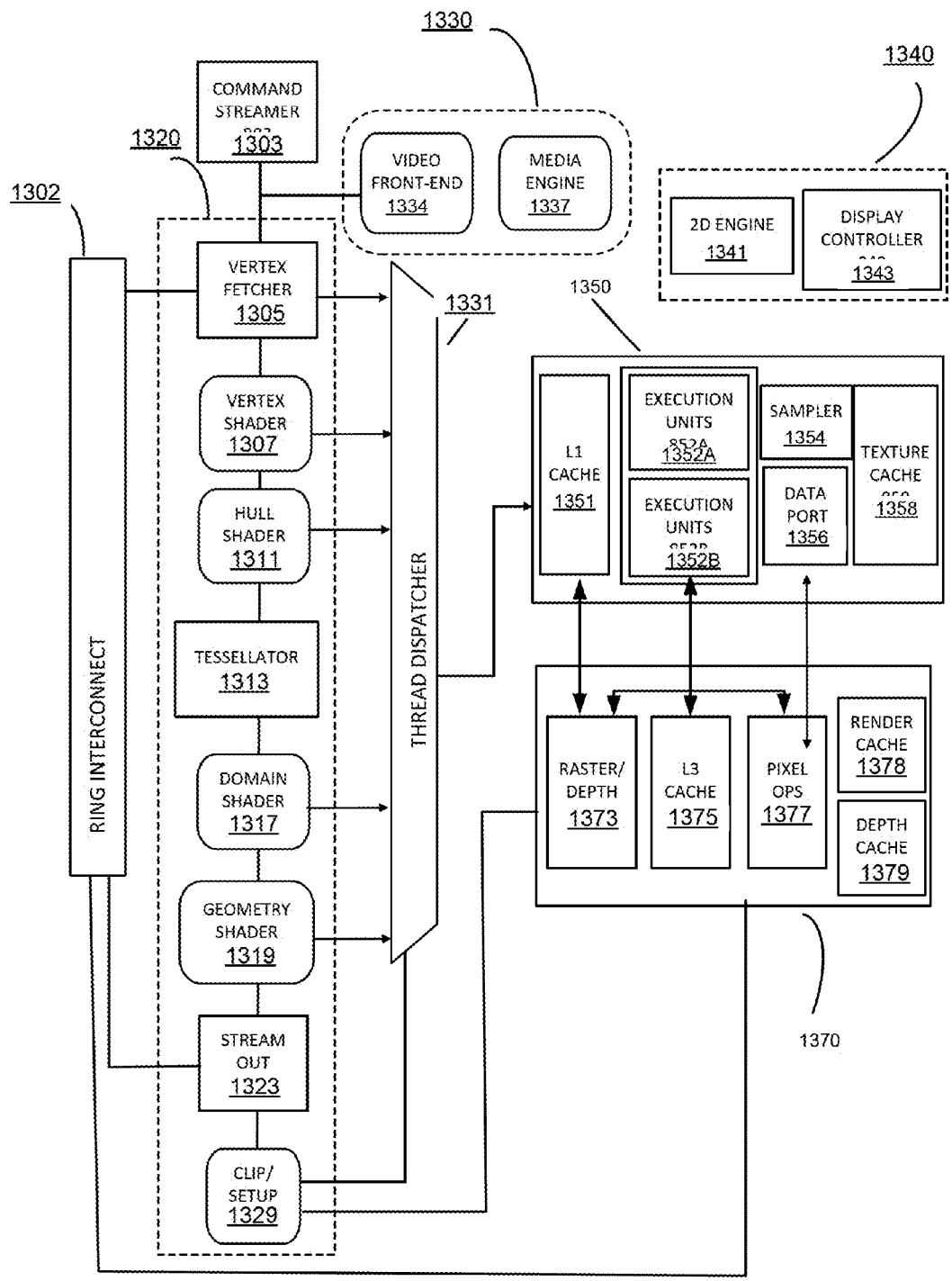
FIG. 13 is a block diagram of another embodiment of a graphics processor which includes a graphics pipeline, a media pipeline, a display engine, thread execution logic, and a render output pipeline.

FIG. 13 is a block diagram of another embodiment of a graphics processor which includes a graphics pipeline 1320, a media pipeline 1330, a display engine 1340, thread execution logic 1350, and a render output pipeline 1370. In one embodiment, the graphics processor is a graphics processor within a multi-core processing system that includes one or more general purpose processing cores. The graphics processor is controlled by register writes to one or more control registers (not shown) or via commands issued to the graphics processor via a ring interconnect 1302. The ring interconnect 1302 couples the graphics processor to other processing components, such as other graphics processors or general-purpose processors. Commands from the ring interconnect are interpreted by a command streamer 1303 which supplies instructions to individual components of the graphics pipeline 1320 or media pipeline 1330.

The command streamer 1303 directs the operation of a vertex fetcher 1305 component that reads vertex data from memory and executes vertex-processing commands provided by the command streamer 1303. The vertex fetcher 1305 provides vertex data to a vertex shader 1307, which performs coordinate space transformation and lighting operations to each vertex. The vertex fetcher 1305 and vertex shader 1307 execute vertex-processing instructions by dispatching execution threads to the execution units 1352A, 1352B via a thread dispatcher 1331.

In one embodiment, the execution units 1352A, 1352B are an array of vector processors having an instruction set for performing graphics and media operations. The execution units 1352A, 1352B have an attached L1 cache 1351 that is specific for each array or shared between the arrays. The cache can be configured as a data cache, an instruction cache, or a single cache that is partitioned to contain data and instructions in different partitions.

In one embodiment, the graphics pipeline 1320 includes tessellation components to perform hardware-accelerated tessellation of 3D objects. A programmable hull shader 1311 configures the tessellation operations. A programmable domain shader 1317 provides back-end evaluation of tessellation output. A tessellator 1313 operates at the direction of the hull shader 1311 and contains special purpose logic to generate a set of detailed geometric objects based on a coarse geometric model that is provided as input to the graphics pipeline 1320. If tessellation is not used, the tessellation components 1311, 1313, 1317 can be bypassed.

The complete geometric objects can be processed by a geometry shader 1319 via one or more threads dispatched to the execution units 1352A, 1352B, or can proceed directly to the clipper 1329. The geometry shader operates on entire geometric objects, rather than vertices or patches of vertices as in previous stages of the graphics pipeline. If the tessellation is disabled the geometry shader 1319 receives input from the vertex shader 1307. The geometry shader 1319 is programmable by a geometry shader program to perform geometry tessellation if the tessellation units are disabled.

Prior to rasterization, vertex data is processed by a clipper 1329, which is either a fixed function clipper or a programmable clipper having clipping and geometry shader functions. In one embodiment, a rasterizer 1373 in the render output pipeline 1370 dispatches pixel shaders to convert the geometric objects into their per pixel representations. In one embodiment, pixel shader logic is included in the thread execution logic 1350.

The graphics engine has an interconnect bus, interconnect fabric, or some other interconnect mechanism that allows data and message passing amongst the major components of the graphics engine. In one embodiment the execution units 1352A, 1352B and associated cache(s) 1351, texture and media sampler 1354, and texture/sampler cache 1358 interconnect via a data port 1356 to perform memory access and communicate with render output pipeline components of the graphics engine. In one embodiment, the sampler 1354, caches 1351, 1358 and execution units 1352A, 1352B each have separate memory access paths.

In one embodiment, the render output pipeline 1370 contains a rasterizer and depth test component 1373 that converts vertex-based objects into their associated pixel-based representation. In one embodiment, the rasterizer logic includes a windower/masker unit to perform fixed function triangle and line rasterization. An associated render and depth buffer caches 1378, 1379 are also available in one embodiment. A pixel operations component 1377 performs pixel-based operations on the data, though in some instances, pixel operations associated with 2D operations (e.g. bit block image transfers with blending) are performed by the 2D engine 1341, or substituted at display time by the display controller 1343 using overlay display planes. In one embodiment a shared L3 cache 1375 is available to all graphics components, allowing the sharing of data without the use of main system memory.

The graphics processor media pipeline 1330 includes a media engine 337 and a video front end 1334. In one embodiment, the video front end 1334 receives pipeline commands from the command streamer 1303. However, in one embodiment the media pipeline 1330 includes a separate command streamer. The video front-end 1334 processes media commands before sending the command to the media engine 1337. In one embodiment, the media engine includes thread spawning functionality to spawn threads for dispatch to the thread execution logic 1350 via the thread dispatcher 1331.

In one embodiment, the graphics engine includes a display engine 1340. In one embodiment, the display engine 1340 is external to the graphics processor and couples with the graphics processor via the ring interconnect 1302, or some other interconnect bus or fabric. The display engine 1340 includes a 2D engine 1341 and a display controller 1343. The display engine 1340 contains special purpose logic capable of operating independently of the 3D pipeline. The display controller 1343 couples with a display device (not shown), which may be a system integrated display device, as in a laptop computer, or an external display device attached via an display device connector.

The graphics pipeline 1320 and media pipeline 1330 are configurable to perform operations based on multiple graphics and media programming interfaces and are not specific to any one application programming interface (API). In one embodiment, driver software for the graphics processor translates API calls that are specific to a particular graphics or media library into commands that can be processed by the graphics processor. In various embodiments, support is provided for the Open Graphics Library (OpenGL) and Open Computing Language (OpenCL) supported by the Khronos Group, the Direct3D library from the Microsoft Corporation, or, in one embodiment, both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Figure 14A:
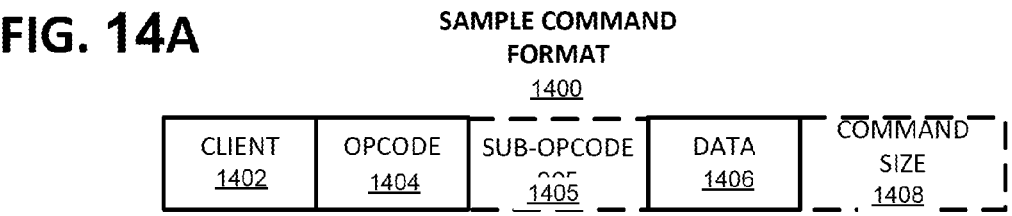
FIG. 14A is a block diagram illustrating a graphics processor command format according to an embodiment and FIG. 14B is a block diagram illustrating a graphics processor command sequence according to an embodiment.
Figure 14B:
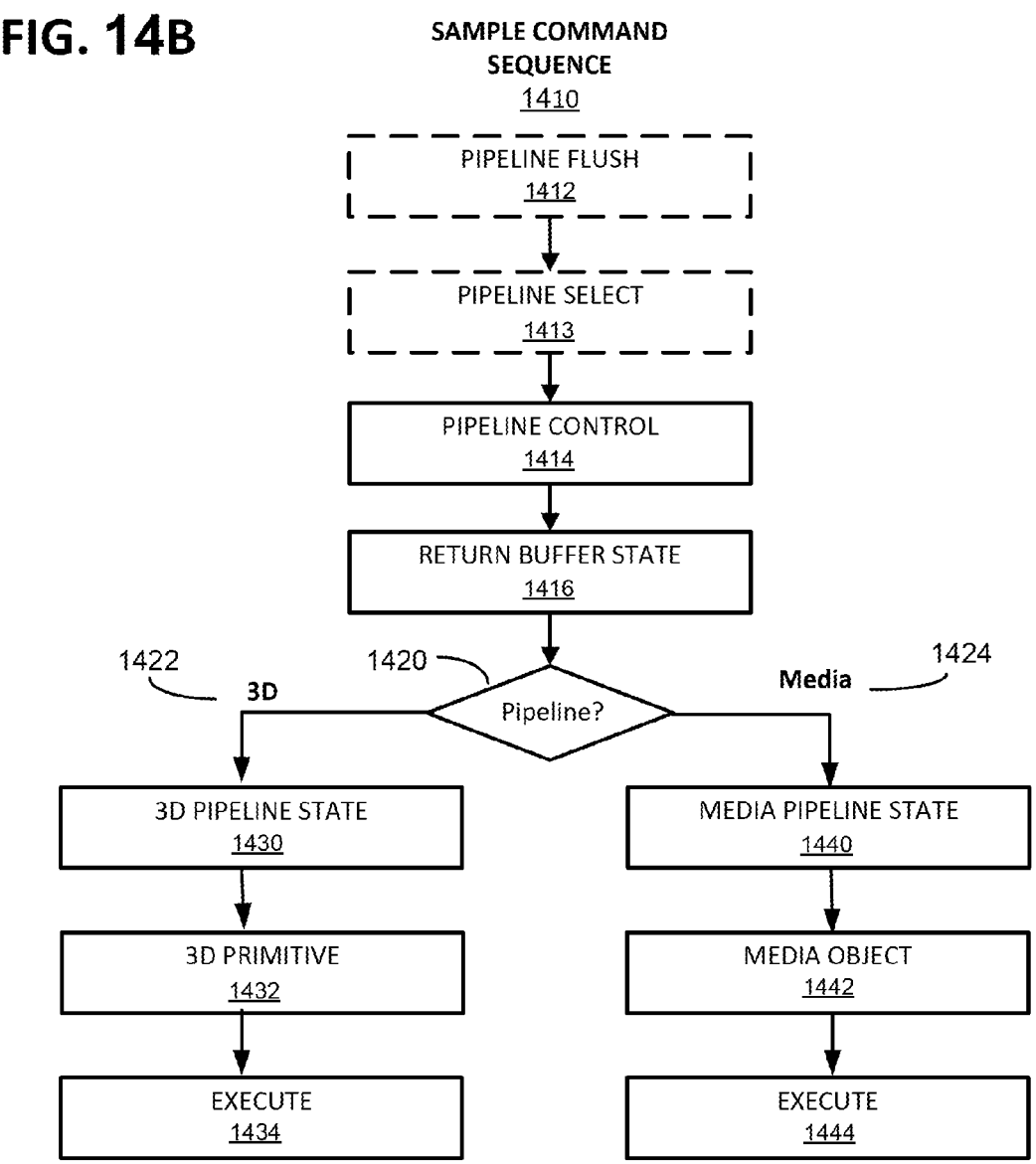

Graphics Pipeline Programming—FIG. 14A-B

FIG. 14A is a block diagram illustrating a graphics processor command format according to an embodiment and FIG. 14B is a block diagram illustrating a graphics processor command sequence according to an embodiment. The solid lined boxes in FIG. 14A illustrate the components that are generally included in a graphics command while the dashed lines include components that are optional or that are only included in a sub-set of the graphics commands. The exemplary graphics processor command format 1400 of FIG. 14A includes data fields to identify a target client 1402 of the command, a command operation code (opcode) 1404, and the relevant data 1406 for the command. A sub-opcode 1405 and a command size 1408 are also included in some commands.

The client 1402 specifies the client unit of the graphics device that processes the command data. In one embodiment, a graphics processor command parser examines the client field of each command to condition the further processing of the command and route the command data to the appropriate client unit. In one embodiment, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 1404 and, if present, sub-opcode 1405 to determine the operation to perform. The client unit performs the command using information in the data 1406 field of the command. For some commands an explicit command size 1408 is expected to specify the size of the command. In one embodiment, the command parser automatically determines the size of at least some of the commands based on the command opcode. In one embodiment commands are aligned via multiples of a double word.

The flow chart in FIG. 14B shows a sample command sequence 1410. In one embodiment, software or firmware of a data processing system that features an embodiment of the graphics processor uses a version of the command sequence shown to set up, execute, and terminate a set of graphics operations. A sample command sequence is shown and described for exemplary purposes, however embodiments are not limited to these commands or to this command sequence. Moreover, the commands may be issued as batch of commands in a command sequence, such that the graphics processor will process the sequence of commands in an at least partially concurrent manner.

The sample command sequence 1410 may begin with a pipeline flush command 1412 to cause any active graphics pipeline to complete the currently pending commands for the pipeline. In one embodiment, the 3D pipeline 1422 and the media pipeline 1424 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. A pipeline flush command 1412 can be used for pipeline synchronization or before placing the graphics processor into a low power state.

A pipeline select command 1413 is used when a command sequence requires the graphics processor to explicitly switch between pipelines. A pipeline select command 1413 is required only once within an execution context before issuing pipeline commands unless the context is to issue commands for both pipelines. In one embodiment, a pipeline flush command is 1412 is required immediately before a pipeline switch via the pipeline select command 1413.

A pipeline control command 1414 configures a graphics pipeline for operation and is used to program the 3D pipeline 1422 and the media pipeline 1424. The pipeline control command 1414 configures the pipeline state for the active pipeline. In one embodiment, the pipeline control command 1414 is used for pipeline synchronization and to clear data from one or more cache memories within the active pipeline before processing a batch of commands.

Return buffer state commands 1416 are used to configure a set of return buffers for the respective pipelines to write data. Some pipeline operations require the allocation, selection, or configuration of one or more return buffers into which the operations write intermediate data during processing. The graphics processor also uses one or more return buffers to store output data and to perform cross thread communication. The return buffer state 1416 includes selecting the size and number of return buffers to use for a set of pipeline operations.

The remaining commands in the command sequence differ based on the active pipeline for operations. Based on a pipeline determination 1420, the command sequence is tailored to the 3D pipeline 1422 beginning with the 3D pipeline state 1430, or the media pipeline 1424 beginning at the media pipeline state 1440.

The commands for the 3D pipeline state 1430 include 3D state setting commands for vertex buffer state, vertex element state, constant color state, depth buffer state, and other state variables that are to be configured before 3D primitive commands are processed. The values of these commands are determined at least in part based the particular 3D API in use. 3D pipeline state 1430 commands are also able to selectively disable or bypass certain pipeline elements if those elements will not be used.

The 3D primitive 1432 command is used to submit 3D primitives to be processed by the 3D pipeline. Commands and associated parameters that are passed to the graphics processor via the 3D primitive 1432 command are forwarded to the vertex fetch function in the graphics pipeline. The vertex fetch function uses the 3D primitive 1432 command data to generate vertex data structures. The vertex data structures are stored in one or more return buffers. The 3D primitive 1432 command is used to perform vertex operations on 3D primitives via vertex shaders. To process vertex shaders, the 3D pipeline 1422 dispatches shader execution threads to graphics processor execution units.

The 3D pipeline 1422 is triggered via an execute 1434 command or event. In one embodiment a register write triggers command execution. In one embodiment execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

The sample command sequence 1410 follows the media pipeline 1424 path when performing media operations. In general, the specific use and manner of programming for the media pipeline 1424 depends on the media or compute operations to be performed. Specific media decode operations may be offloaded to the media pipeline during media decode. The media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

The media pipeline 1424 is configured in a similar manner as the 3D pipeline 1422. A set of media pipeline state commands 1440 are dispatched or placed into in a command queue before the media object commands 1442. The media pipeline state commands 1440 include data to configure the media pipeline elements that will be used to process the media objects. This includes data to configure the video decode and video encode logic within the media pipeline, such as encode or decode format. The media pipeline state commands 1440 also support the use one or more pointers to "indirect" state elements that contain a batch of state settings.

Media object commands 1442 supply pointers to media objects for processing by the media pipeline. The media objects include memory buffers containing video data to be processed. In one embodiment, all media pipeline state must be valid before issuing a media object command 1442. Once the pipeline state is configured and media object commands 1442 are queued, the media pipeline 1424 is triggered via an execute 1434 command or an equivalent execute event (e.g., register write). Output from the media pipeline 1424 may then be post processed by operations provided by the 3D pipeline 1422 or the media pipeline 1424. In one embodiment, GPGPU operations are configured and executed in a similar manner as media operations.

Figure 15:
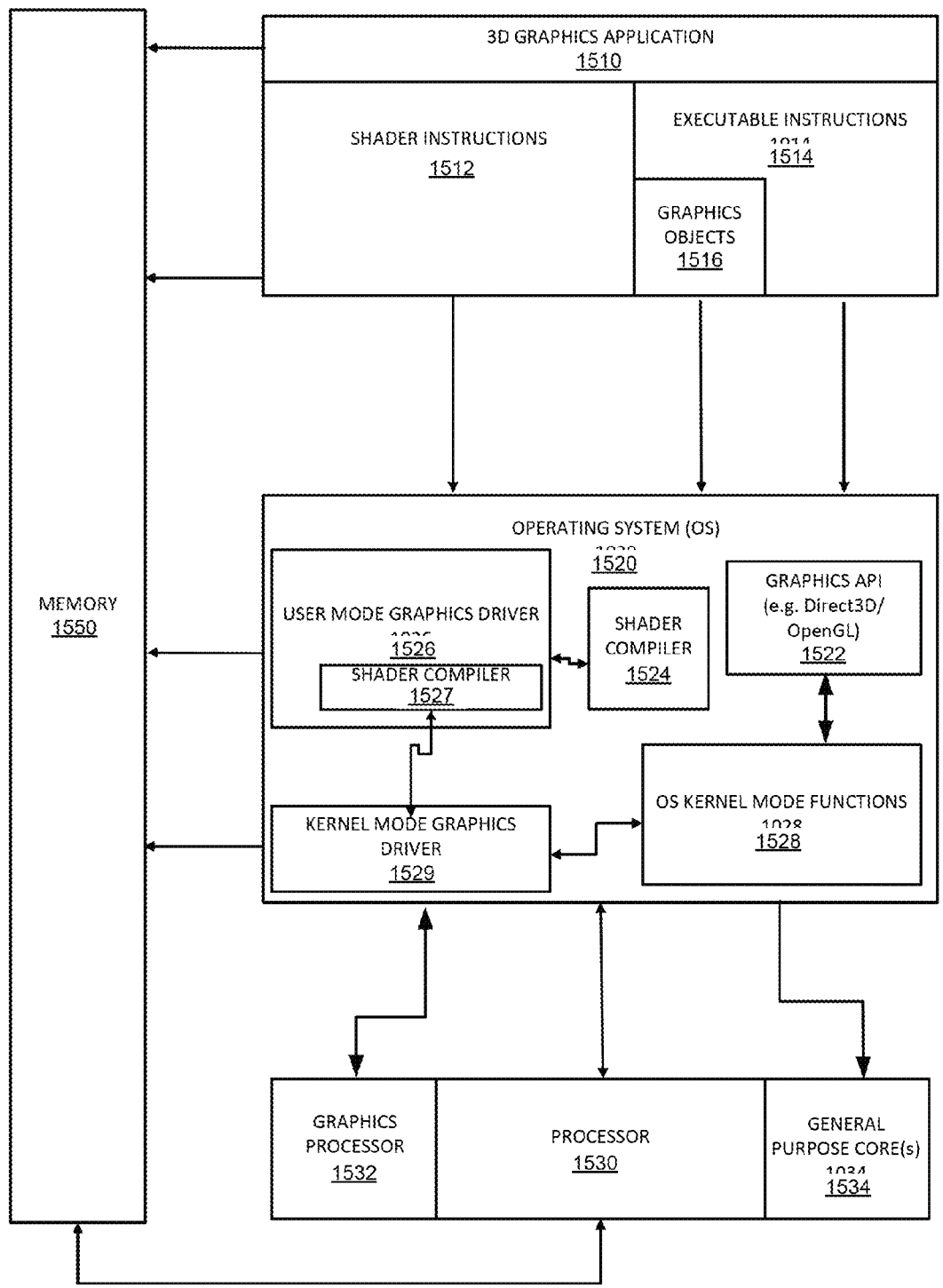
FIG. 15 illustrates exemplary graphics software architecture for a data processing system according to an embodiment.

Graphics Software Architecture—FIG. 15

FIG. 15 illustrates exemplary graphics software architecture for a data processing system according to an embodiment. The software architecture includes a 3D graphics application 1510, an operating system 1520, and at least one processor 1530. The processor 1530 includes a graphics processor 1532 and one or more general-purpose processor core(s) 1534. The graphics application 1510 and operating system 1520 each execute in the system memory 1550 of the data processing system.

In one embodiment, the 3D graphics application 1510 contains one or more shader programs including shader instructions 1512. The shader language instructions may be in a high-level shader language, such as the High Level Shader Language (HLSL) or the OpenGL Shader Language (GLSL). The application also includes executable instructions 1514 in a machine language suitable for execution by the general-purpose processor core 1534. The application also includes graphics objects 1516 defined by vertex data.

The operating system 1520 may be a Microsoft® Windows® operating system from the Microsoft Corporation, a proprietary UNIX-like operating system, or an open source UNIX-like operating system using a variant of the Linux kernel. When the Direct3D API is in use, the operating system 1520 uses a front-end shader compiler 1524 to compile any shader instructions 1512 in HLSL into a lower-level shader language. The compilation may be a just-in-time compilation or the application can perform share pre-compilation. In one embodiment, high-level shaders are compiled into low-level shaders during the compilation of the 3D graphics application 1510.

The user mode graphics driver 1526 may contain a back-end shader compiler 1527 to convert the shader instructions 1512 into a hardware specific representation. When the OpenGL API is in use, shader instructions 1512 in the GLSL high-level language are passed to a user mode graphics driver 1526 for compilation. The user mode graphics driver uses operating system kernel mode functions 1528 to communicate with a kernel mode graphics driver 1529. The kernel mode graphics driver 1529 communicates with the graphics processor 1532 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The following examples pertain to further embodiments:

Example 1 is a method comprising: receiving an encoded video information that includes a plurality of thread; determining a first and a second set of threads from the plurality of thread; assigning the first and second set of threads to a hardware scoreboard and a software scoreboard, respectively; and enforcing dependency threads in the first and second set of threads.

In example 2, the method as recited in example 1, wherein the first set of threads includes at least one thread that is dispatched later in time as compared to another at least one thread from the second set of threads.

In example 3, the method as recited in example 2, wherein the first set of threads includes higher number of dispatch orders as compared to the dispatch orders of the second set of threads.

In example 4, the method as recited in example 1, wherein the assigning is limited by a number of dependency entries of the hardware scoreboard, the number of dependency entries includes 8 entries.

In example 5, the method as recited in example 1, wherein the same number of dependency entries are selected for the hardware scoreboard and the software scoreboard, wherein the dependency entries are fixed for a kernel level.

In example 6, the method as recited in example 5, wherein a selection of the dependency entries utilizes a statistical algorithm.

In example 7, the method as recited in example 5, wherein a selection of the dependency entries includes calculation of a histogram for the plurality of threads.

In example 8, the method as recited in example 1, wherein the determining of the first and second set of threads includes determining spatial positions for each thread in the plurality of threads.

In example 9, the methods as recited in any of examples 1 to 8, wherein the encoded video information includes a high efficiency video coding (HEVC) Intra-Prediction algorithm.

In example 10, the methods as recited in any of examples 1 to 8, wherein a combination of the hardware and software scoreboards is utilized to finish execution of workloads in each thread in the plurality of threads.

Example 11 is a device comprising: an antenna configured to receive an encoded video information that includes a plurality of thread; a hybrid scoreboard configured to facilitate decoding of the encoded video information, the hybrid scoreboard utilizes a combination of a hardware scoreboarding and a software scoreboarding to execute a workload in each thread of the plurality of threads, wherein the hybrid scoreboard determines and assigns a first set and a second set of threads from the plurality of hardware to the hardware scoreboard and the software scoreboard, respectively.

In example 12, the device as recited in example 11, wherein the first set of threads includes at least one thread that is dispatched later in time as compared to another at least one thread from the second set of threads.

In example 13, the device as recited in example 12, wherein the first set of threads includes higher number of dispatch orders as compared to the dispatch orders of the second set of threads.

In example 14, the devices as recited in any of examples 11 to 13, wherein the encoded video information includes a high efficiency video coding (HEVC) Intra-Prediction algorithm.

In example 15, the devices as recited in any of examples 11 to 13, wherein the hybrid scoreboard determines the first and second set of threads based on spatial positions for each thread in the plurality of threads.

Example 16 is one or more computer-readable media storing processor-executable instructions that when executed cause one or more processors to implement a method, the method comprising: receiving an encoded video information that includes a plurality of thread; determining a first set and a second set of threads from the plurality of threads based on a dispatch order and a spatial location each thread in the plurality of thread; assigning the first and second set of threads to a hardware scoreboard and a software scoreboard, respectively, wherein a statistical algorithm is utilized to determine dependency entries for the hardware scoreboard and the software scoreboard; and executing concurrently the first and second set of threads.

In example 17, the one or more computer-readable media as recited in example 16, wherein the first set of threads includes at least one thread that is dispatched later in time as compared to another at least one thread from the second set of threads.

In example 18, the one or more computer-readable media as recited in example 16, wherein the dispatch order of the first set of threads includes a higher number as compared to the dispatch order of the second set of threads.

In example 19, the one or more computer-readable media as recited in example 16, wherein the assigning is limited by a number of the dependency entries of the hardware scoreboard, the number of dependency entries includes 8 entries.

In example 20, the one or more computer-readable media as recited in any of examples 16 to 19 wherein the same number of dependency entries are selected for the hardware scoreboard and the software scoreboard, wherein the dependency entries are fixed for a kernel level.

What is claimed is:

1. A method for enforcing thread dependency using a hybrid scoreboard that utilizes a combination of a hardware scoreboard and a software scoreboard, comprising:
    receiving an encoded video information comprising a plurality of threads including a dependent thread and a plurality of associated threads to which execution of the dependent thread is dependent upon, wherein each of the plurality of threads includes a dispatch order including a time instant when the thread was dispatched;
    determining, based on the dispatch order and a spatial position of each thread of the plurality of threads, a first set of threads with a long waiting time and a second set of threads with a short waiting time from the plurality of associated threads, wherein the first set of threads includes threads that are dispatched later in time as compared to threads from the second set of threads;

assigning the first set of threads and the second set of threads to the hardware scoreboard and the software scoreboard, respectively;

stalling execution on a workload of the dependent thread until workloads on the first and second set of threads that are assigned and processed by the hardware scoreboard and the software scoreboard, respectively, are finished;

polling the software scoreboard to determine the processed workloads on the second set of threads only, wherein the polling is substantially minimized by the assignment of the second set of threads of the plurality of associated threads to the software scoreboard, and wherein the hardware scoreboard guarantees dependency on the first set of threads without polling; and executing the workload of the dependent thread, in response to determination that the execution of workloads on the first and second set of threads of the plurality of associated threads are finished.

2. The method as recited in claim 1, wherein the encoded video information includes a high efficiency video coding (HEVC) Intra-Prediction algorithm.

3. The method as recited in claim 1, wherein the first set of threads of the plurality of associated threads includes higher number of dispatch orders as compared to the dispatch orders of the second set of threads of the plurality of associated threads.

4. The method as recited in claim 1, wherein the assigning is limited by a number of dependency entries of the hardware scoreboard, the number of dependency entries includes 8 entries.

5. The method as recited in claim 1, wherein the same number of dependency entries are selected for the hardware scoreboard and the software scoreboard, wherein the dependency entries are fixed for a kernel level.

6. The method as recited in claim 5, wherein a selection of the dependency entries utilizes a statistical algorithm.

7. The method as recited in claim 5, wherein a selection of the dependency entries for the hardware scoreboard includes calculation of a histogram to determine the first set for the plurality of threads.

8. The method as recited in claim 1, wherein a combination of the hardware and software scoreboards is utilized to finish execution of the workloads in each thread in the plurality of threads.

9. A device for enforcing thread dependency using a hybrid scoreboard, comprising:

an antenna configured to receive an encoded video information comprising a plurality of threads including a dependent thread and a plurality of associated threads to which execution of the dependent thread is dependent upon, wherein each of the plurality of threads includes a dispatch order including a time instant when the thread was dispatched;

a hybrid scoreboard configured to:
  facilitate decoding of the encoded video information, the hybrid scoreboard utilizing a combination of a hardware scoreboard and a software scoreboard to execute a workload in each thread of the plurality of threads;
  determine, based on the dispatch order and a spatial position of each thread of the plurality of threads, a first set of threads with a long waiting time and a second set of threads with a short waiting time from the plurality of associated threads, wherein the first set of threads includes threads that are dispatched later in time as compared to threads from the second set of threads;
  assign the first set of threads and the second set of threads to the hardware scoreboard and the software scoreboard, respectively;
  stall execution on the workload of the dependent thread until workloads on the first and second set of threads that are assigned and processed by the hardware scoreboard and the software scoreboard, respectively, are finished;
  poll the software scoreboard to determine the processed workloads on the second set of threads only, wherein the polling on the software scoreboard is substantially minimized by the assignment of the second set of threads of the plurality of associated threads to the software scoreboard, and wherein the hardware scoreboard guarantees dependency on the first set of threads without polling; and
  execute the workload of the dependent thread, in response to determination that the execution of workloads on the first and second set of threads of the plurality of associated threads are finished.

10. The device as recited in claim 9, wherein the encoded video information includes a high efficiency video coding (HEVC) Intra-Prediction algorithm.

11. The device as recited in claim 9, wherein the first set of threads of the plurality of associated threads includes higher number of dispatch orders as compared to the dispatch orders of the second set of threads of the plurality of associated threads.

12. One or more non-transitory computer-readable media storing processor-executable instructions that when executed cause one or more processors to implement a method for enforcing thread dependency using a hybrid scoreboard that utilizes a combination of a hardware scoreboard and a software scoreboard, the method comprising:

receiving an encoded video information that comprising a plurality of threads including a dependent thread and a plurality of associated threads to which execution of the dependent thread that is dependent upon, wherein each of the plurality of threads includes a dispatch order including a time instant when the thread was dispatched;

determining, based on the dispatch order and a spatial position of each thread of the plurality of threads, a first set of threads with a long waiting time and a second set of threads with a short waiting time from the plurality of associated threads, wherein the first set of threads includes threads that are dispatched later in time as compared to threads from the second set of threads;

assigning the first set of threads and the second set of threads to the hardware scoreboard and the software scoreboard, respectively;

stalling execution on a workload of the dependent thread until workloads on the first and second set of threads that are assigned and processed by the hardware scoreboard and the software scoreboard, respectively, are finished;

polling the software scoreboard to determine the processed workloads on the second set of threads only, wherein the polling on the software scoreboard is substantially minimized by the assignment of the second set of threads of the plurality of associated threads to the software scoreboard, and wherein the hardware scoreboard guarantees dependency on the first set of threads without polling; and executing the workload of the dependent thread, in response to determination that the execution of workloads on the first and second set of threads of the plurality of associated threads are finished.

13. The one or more non-transitory computer-readable media as recited in claim 12, wherein the dispatch order of the first set of threads of the plurality of associate threads includes a higher number as compared to the dispatch order of the second set of threads of the plurality of associated threads.

14. The one or more non-transitory computer-readable media as recited in claim 12, wherein the assigning is limited by a number of the dependency entries of the hardware scoreboard, the number of dependency entries includes 8 entries.

15. The one or more non-transitory computer-readable media as recited in claim 12 wherein the same number of dependency entries are selected for the hardware scoreboard and the software scoreboard, wherein the dependency entries are fixed for a kernel level.

\* \* \* \* \*